United States Patent [19]
Luecke et al.

[11] Patent Number: 5,410,206
[45] Date of Patent: Apr. 25, 1995

[54] PIEZOELECTRIC ACTUATOR FOR OPTICAL ALIGNMENT SCREWS

[75] Inventors: Francis S. Luecke, San Jose; Alexander Tuganov, Mountain View, both of Calif.

[73] Assignee: New Focus, Inc., Sunnyvale, Calif.

[21] Appl. No.: 43,263

[22] Filed: Apr. 6, 1993

[51] Int. Cl.⁶ .............................................. H01L 41/08
[52] U.S. Cl. ...................................... 310/328; 310/317
[58] Field of Search ................................ 310/317, 328

[56] References Cited

U.S. PATENT DOCUMENTS

| | | | |
|---|---|---|---|
| 3,320,580 | 5/1967 | Sykes | 310/328 |
| 3,902,085 | 8/1975 | Bizzigotti | 310/8.3 |
| 4,453,103 | 6/1984 | Vishnevsky et al. | 310/323 |
| 4,525,852 | 6/1985 | Rosenberg | 378/34 |
| 4,594,584 | 6/1986 | Pfeiffer et al. | 310/328 |
| 4,607,166 | 8/1986 | Tamaki | 250/442.1 |
| 4,622,483 | 11/1986 | Staufenberg, Jr. et al. | 310/328 |
| 4,647,808 | 3/1987 | Shibuya | 310/328 |
| 4,714,855 | 12/1987 | Fujimoto | 310/328 |
| 4,727,278 | 2/1988 | Staufenberg, Jr. et al. | 310/328 |
| 4,775,815 | 10/1988 | Heinz | 310/328 |
| 4,831,306 | 5/1989 | Stafenberg, Jr. et al. | 310/328 |
| 4,857,793 | 8/1989 | Okuno | 310/328 |
| 4,933,590 | 6/1990 | Inoue et al. | 310/323 |
| 4,975,615 | 12/1990 | Katahara | 310/328 |
| 5,017,820 | 5/1991 | Culp | 310/328 |
| 5,027,028 | 6/1991 | Skipper | 310/328 |
| 5,034,647 | 7/1991 | Ohtsuka | 310/328 |
| 5,079,471 | 1/1992 | Nygren | 310/328 |
| 5,140,470 | 8/1992 | Luecke | 359/818 |

OTHER PUBLICATIONS

"Piezoelectric Traction Motor Delivers High Torque, High Power at Low Speed", Skipper, PCIM, Jun., 1992, pp. 36–40.

"Vertical Inertial Piezoelectric Translation Device for Scanning Tunneling Microscope", Agrait, Rev. Sci. Instrum., 63, No. 1, Jan., 1992, pp. 263–264.

"Piezoelectric Inertial Stepping Motor and Spherical Rotor", Howald, Rudin and Guntherodt, Rev. Sci. Instrum., 63, No. 8, Aug., 1992, pp. 3909–3912.

*Primary Examiner*—Thomas M. Dougherty
*Attorney, Agent, or Firm*—Hugh D. Jaeger

[57] ABSTRACT

A piezoelectric actuator for rotating a shaft associated with an optical mount positioning system in which the actuator moves in first direction at a slow enough velocity to maintain engagement between the actuator and shaft to drive the shaft in the desired direction, and the actuator moves in a second direction at a sufficiently high acceleration and velocity to cause the actuator to lose engagement with the shaft and slip, thereby achieving motion of the shaft in only the desired direction.

9 Claims, 23 Drawing Sheets

PIEZOELECTRIC ACTUATOR FOR OPTICAL ALIGNMENT SCREWS

BACKGROUND OF THE INVENTION

1. Field of the Invention

This invention relates to electromechanical actuators, and particularly to actuators utilizing piezoelectric elements to rotate positioning shafts associated with optical elements.

2. Description of the Prior Art

The bench setups used in experimental optics frequently incorporate individual optical elements, such as lenses, filters, mirrors, radiation sources and radiation detectors, which are mounted on adjustable supports. Such supports are capable of both lateral and vertical adjustment to properly position the element within the optical system. Additionally, some form of tilt (axial orientation) adjustment is provided for properly orienting the element with respect to the optical axis of the system. While the particular form of the tilt adjustment varies according to the nature of the optical element and the precision required, a common form of adjustable mount is a three screw device, such as the Model 9809 sold by New Focus, Inc. of Mountain View, Calif., and described in U.S. Pat. No. 5,140,470, entitled "Optical Mounting Apparatus" issued to Francis S. Luecke and assigned to New Focus, Inc., the assignee of this invention. This mount, and other similar mounts sold by New Focus, Inc., has three ¼-80 adjustment screws arranged in a triangular configuration for tilting the optical element held by the mount. The adjustment screws in this device are provided with knurled knobs for manual adjustment.

These mounts have been highly successful and are widely used in experimental optical setups. They provide excellent stability and accommodate ease of adjustment. Nevertheless, it would be desirable to avoid even the slight deflection of the optical element which results from manual adjustment of the mount. Further, certain experimental optical setups may occupy a large space, and make manual adjustment of the mounts located in the interior portions of the optical bench more awkward than desirable. In addition, it is usually desirable to make dynamic adjustments on the system; that is, while the system is in actual operation. This introduces an element of danger with systems incorporating lasers, since inadvertent exposure to laser radiation may permanently damage eyesight or other parts of the human body.

Despite the disadvantages inherent in the use of manual adjustment screws, the use of electrically driven actuators has been limited by cost, size and stability considerations. These limitations have limited the use of remotely controlled actuators to particular optical elements, wherein the optical element and the actuator are interrelated and the actuator is totally dedicated to the single element. While this approach is frequently satisfactory in a finished optical system, it is unduly cumbersome and expensive in experimental setups.

It has been recognized that piezoelectric systems are well suited for mechanically driving the positioning shafts in an optical system. For example, U.S. Pat. No. 4,622,483 to Staufenberg and Hubbell is descriptive of a system which utilizes piezoelectric elements to alternatively clamp and drive a mechanical element such as shaft.

U.S. Pat. No. 4,727,278 to Staufenberg describes a piezoelectric multi-axis positioner for rotation of a sphere which supports an optical element. The tilt systems described therein are limited to spherical mounts, and do not lend themselves to use with universal mounts such as the New Focus Model 9809.

Still another piezoelectric driven system is shown in U.S. Pat. No. 4,831,306 to Staufenberg and Hubbell. In this system, a piezoelectric element mounted within an annular housing is energized in a fashion, whereby an engaging member is driven with a first polarity signal to cause engagement with an output shaft, and then driven with a second polarity signal to withdraw the member from engagement with the output shaft.

Piezoelectric devices have been used for other purposes such as that described by L. Howald, H. Rudin and H.-J. Guntherodt in "Piezoelectric inertial stepping motor with spherical rotor", Review of Scientific Instruments 63 (8) August 1992 p. 3909–3912. The publication describes a system in which a plurality of inertial piezoelectric actuators are used to position a polished steel sphere which may support an optical element. In the system described by the publication, the actuators are driven slowly in one direction and abruptly in the opposite direction. Friction causes the polished ball to follow the slow actuator movement but inertia prevents the ball from following the abrupt actuator movement.

A publication by John D. Skipper, "Piezoelectric Traction Motor Delivers High Torque, High Power at Low Speed" in PCIM, June 1992, p. 36–39, describes a piezoelectric motor having a rotary output shaft. This publication describes the difficulty of coupling piezoelectric devices to a rotary output shaft due to the very small mechanical movement of the piezoelectric device.

SUMMARY OF THE INVENTION

The present invention provides a low cost piezoelectric actuator having a single piezoelectric element mounted in a frame element of simple design having a pair of abutting jaw elements which are adapted to fit about the threaded shaft to be driven. The piezoelectric element is operative to effect reciprocating motion of the abutting jaw elements in parallel paths. The reciprocating motion of the jaw elements against the driven output shaft held therebetween is converted to simple rotary motion by moving the jaws relatively slowly in a first direction such that the coefficient of friction between the shaft and the jaws overcomes inertia of the shaft. Engagement is maintained between the jaws and the shaft to incrementally rotate the shaft. Motion of the jaws in the second direction is relatively fast, such that the inertia of the output shaft prevents it from following the jaw motion and the shaft slips in the jaws, preserving the preceding incremental motion. The result is a stepwise rotation of the output shaft. Rotational motion of the shaft in the reverse direction is accomplished by simply interchanging the speeds of the motion in the first and second directions.

The maximum width of the device need be only slightly greater than the diameter of the output shaft. Since the output shaft is typically 0.25 inches, the maximum width can be easily kept under 0.5 inches. The length of the device needed to drive a 0.25 inch output shaft need be no more than 1.0 inch and the thickness can be less than 0.3 inches, providing an exceptionally compact unit.

Since the device accommodates an external drive shaft, it is easily added to an existing mount with a simple engagement pin or clamp to prevent the actuator from rotating relative to the optical mount which supports the adjustment screw. The device can be added to existing optical mounts by simply removing the adjustment screw, threading it between the jaws of the device, reinserting the screw into the mount, and fixing the position of the device relative to the mount.

Due to the simplicity of the design and the ease of fabrication from conventional materials, the device is inexpensive to manufacture.

Because of the small size of the device, it can be used in crowded, complex, optical setups without requiring compromises in the optical system.

By using the inertial characteristics of the output shaft to avoid rotation in the direction opposite from that desired, the device eliminates the requirement for piezoelectric elements which clamp the output shaft. This greatly reduces both the size and the complexity of the system, as well as the associated electronics.

Since the device does not depend on mechanical resonance of the system, it can provide a wide range of output speeds and movement. Bi-directional rotation in the range of 2-3 RPM is easily achieved with a 0.25 inch output shaft. Since a single step of the actuator provides approximately 1 minute of rotational shaft movement, very precise positioning of the optical element is available on the order of 0.02 micrometers. This is substantially more precise than can be reliably obtained with manual adjustment techniques. In addition, since the device is remotely controlled, the optical experimenter can easily monitor the effect of the adjustment on the optical system at a position which may be remote from the actual point of adjustment.

While certain of these advantages can be individually found in the prior art, there is no known prior art device which accomplishes bi-directional rotation of an output shaft with a simple design utilizing a singe piezoelectric element in conjunction with the inertial characteristics of the output shaft.

It is an object of the invention to provide a small, low cost and reliable piezoelectric actuator suitable for use in speedily and accurately positioning an adjustment shaft such as used in adjustable mounts for optical elements.

Another object of the invention is to provide a bi-directional piezoelectric drive system for an output shaft in which only one piezoelectric element is required.

Still another object of the invention is to provide a bi-directional piezoelectric drive system for a rotary output shaft which does not utilize a piezoelectric clamping device and therefore requires but a single piezoelectric element.

It is further object of the invention to provide a piezoelectric actuator for an adjustable optical mount which can be controlled with a conventional, two-axis joystick device of the type commonly used to play computer games.

Still another object of the invention is to provide a piezoelectric actuator system for a three screw optical mount, which accommodates control signals developed from a conventional two-axis joystick device to move individual adjustment shafts of an optical mount, and various combinations of the adjustment shafts, including simultaneous motion of all the adjustment shafts.

It is still another object of the invention to provide a piezoelectric actuator for the adjustment screws of an optical mount to tilt the mount in any direction and to translate the mount longitudinally along the optical axis of the system incorporating the mount.

DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENT

Figure 1:
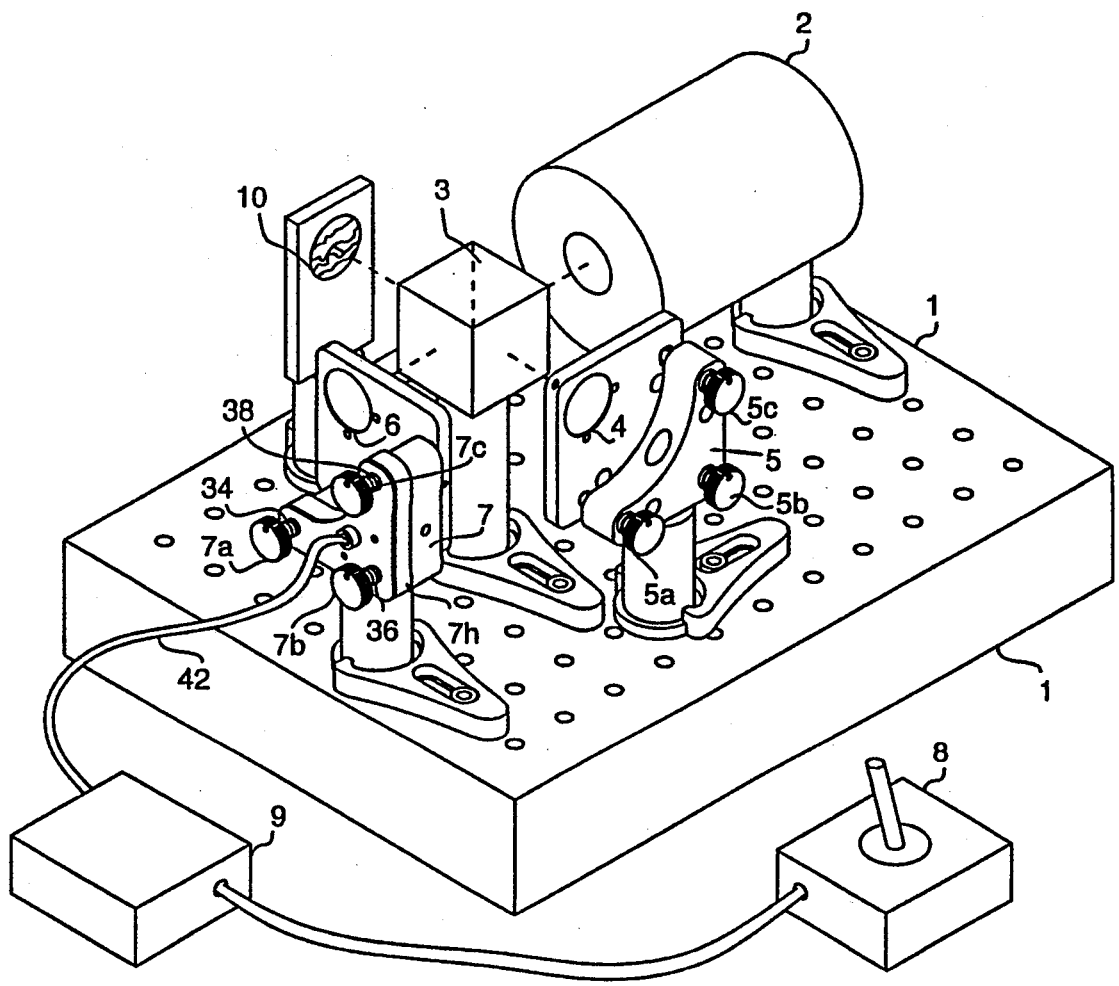
FIG. 1 is a pictorial view of a Michelson interferometer optical setup utilizing an adjustable optical mount to which has been added the piezoelectric actuators of the invention.

The Michelson interferometer optical system shown in FIG. 1 includes an optical bench 1 on which a radiation source, such as laser and beam expander 2 is mounted. The output beam of laser 2 is directed to the beam-splitting cube 3, which directs a portion of the incident beam to a reference mirror 4 positioned by a manually adjustable New Focus Model 9809 mount 5, which is affixed to optical bench 1. Another portion of the incident beam is directed to a second mirror 6, which may be under test or evaluation. The reflected beams from mirrors 4 and 6 are recombined in beam-splitting cube 3, and directed to viewing screen 10.

Fine positioning of mirror 4 is accomplished in a conventional fashion by means of the adjustment screws 5a, 5b and 5c. The adjustment screws 34, 36 and 38 of adjustable mount 7 holding test mirror 6 may be manually adjusted by means of knobs 7a, 7b and 7c in a fashion similar to mount 5. Additionally, the adjustment screws 34, 36 and 38 may be driven by piezoelectric actuators within the housing 7h in response to signals developed with the joystick control device 8. Signals from joystick control device 8 are converted into drive signals for the piezoelectric actuators by electronic controller 9. Control signals developed in response to movement of the joystick provide for individual movement of each of three adjustment screws 34, 36 and 38, as well as simultaneous movement of two screws dependent on the positioning of the joystick. The joystick also includes a "fire" button which develops a control signal, which is effective to drive all three screws simultaneously.

It will be appreciated that the representation of FIG. 1 is for the purpose of illustrating the environment in which the invention is used, and has been greatly simplified from actual setups in which the optical system is typically far more complex.

Figure 2:
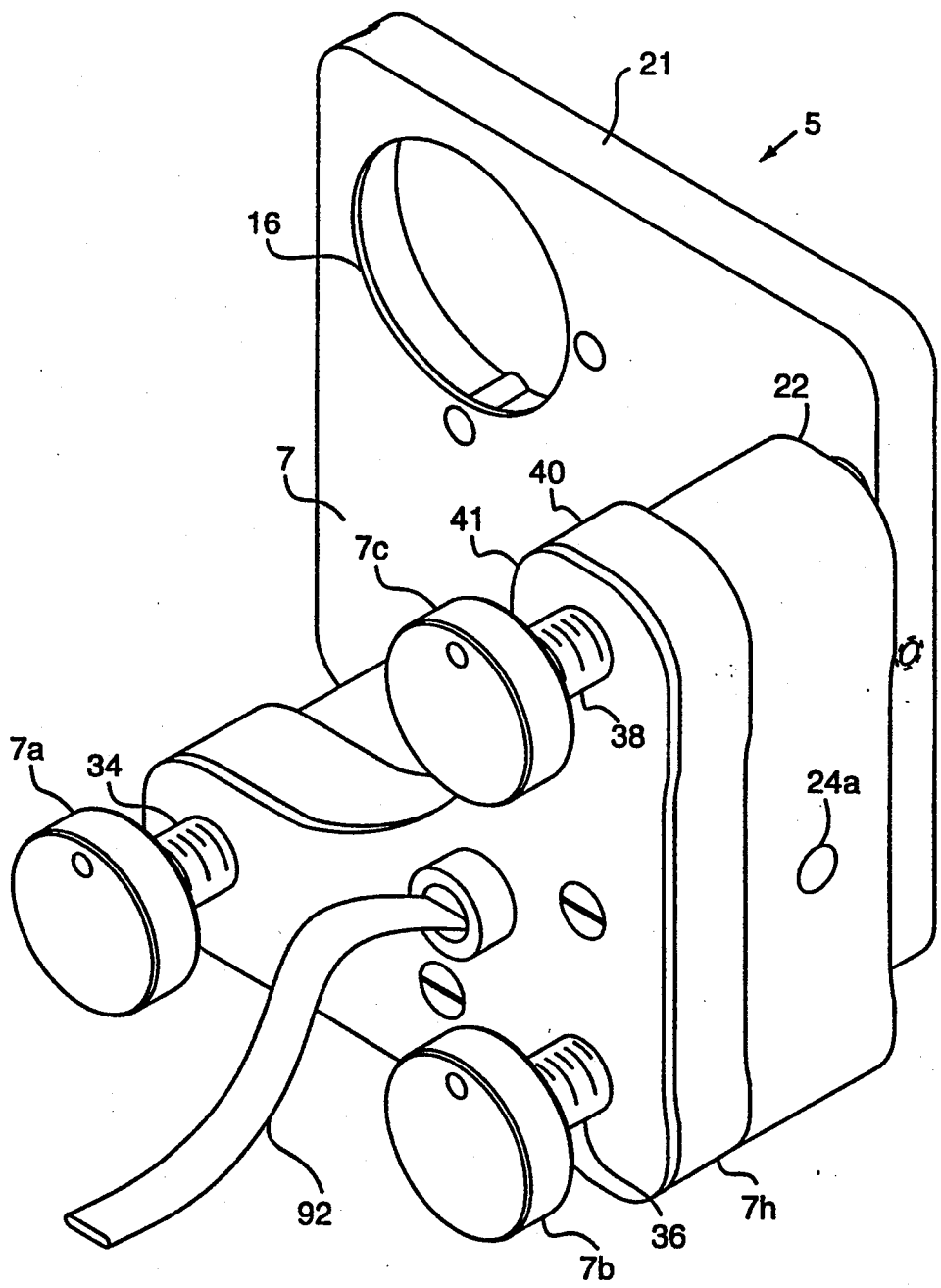
FIG. 2 is an isometric view of the housing used to contain the piezoelectric actuators of the invention.

FIG. 2 shows the optical mount 5 of FIG. 1 in more detail. The stage plate 21 has a mounting region 16 which can accommodate a lens, mirror, filter, diffraction grating, beam splitter or similar optical element. Base plate 22 includes an attachment hole on each of the flat sides, such as threaded hole 24a, which provide for mounting on a vertical support member, such as a post or threaded rod. Adjustment screws 34, 36 and 38 pass through corresponding threaded ports in base plate 22. The tips of adjustment screws 34, 36 and 38 rest in shallow receptacles in stage plate 21. Spring means positioned between adjustment screws 34 and 36, and 36 and 38, but not shown in the drawing, hold the stage plate against the tips of the adjustment screws 34, 36 and 38. Further details of the optical mount are contained in U.S. Pat. No. 5,140,470, the contents of which are incorporated herein by reference.

The angle of stage plate 21 relative to base plate 22, and therefore the rest of the optical system, may be altered by rotation of the individual adjustment screws 34, 36, and 38, causing them to extend or retract dependent on the direction of rotation. While manual adjustment of the position of adjustment screws 34, 36 and 38 may be accomplished with the knobs at the ends of the screws, even the slightest contact with the knobs may introduce permanent or temporary displacement of the stage plate 21 and the base plate 22 relative to the rest of the optical system. To allow the angle of the stage plate 21 to be adjusted without human physical or manual contact with the adjustment screws 34, 36 and 38, piezoelectric actuators are mounted within the actuator housing 40, which is affixed to base plate 22. Each adjustment screw has an associated piezoelectric actuator which can be energized with a drive signal to cause rotation of the screw in either direction. The drive signals developed by electronic controller 9 in response to movement of joystick control device 8 are conveyed to the piezoelectric actuators by means of the cable 42 which passes through the actuator housing cover 41.

Figure 3:
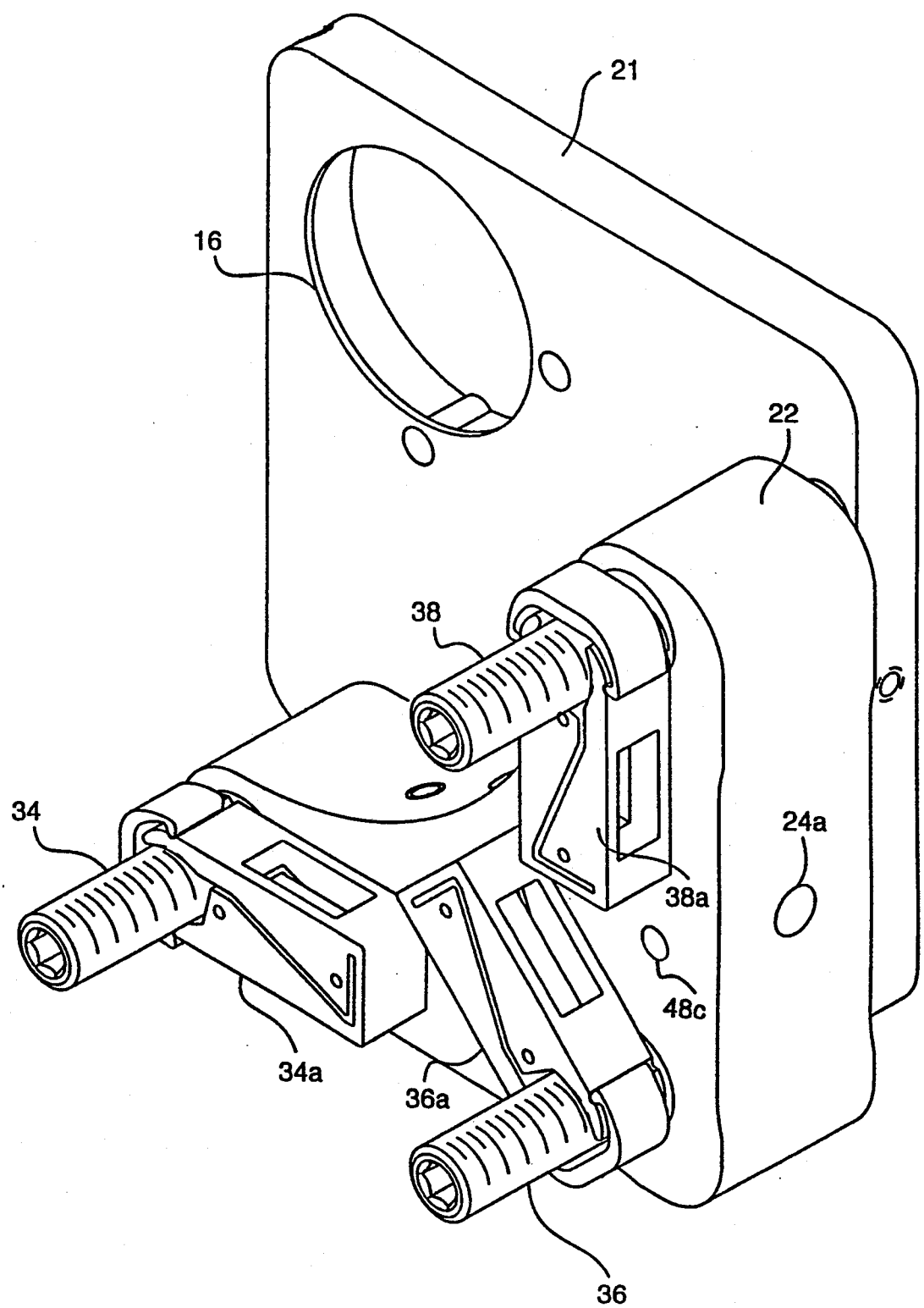
FIG. 3 is an isometric view of the optical mounting apparatus showing the placement of the piezoelectric drivers on the positioning screws.

FIG. 3 shows the optical mount with actuator housing 40 and cover 41 removed, revealing the piezoelectric actuators 34a, 36a and 38a mounted on adjustment screws 34, 36 and 38, respectively.

Figure 4:
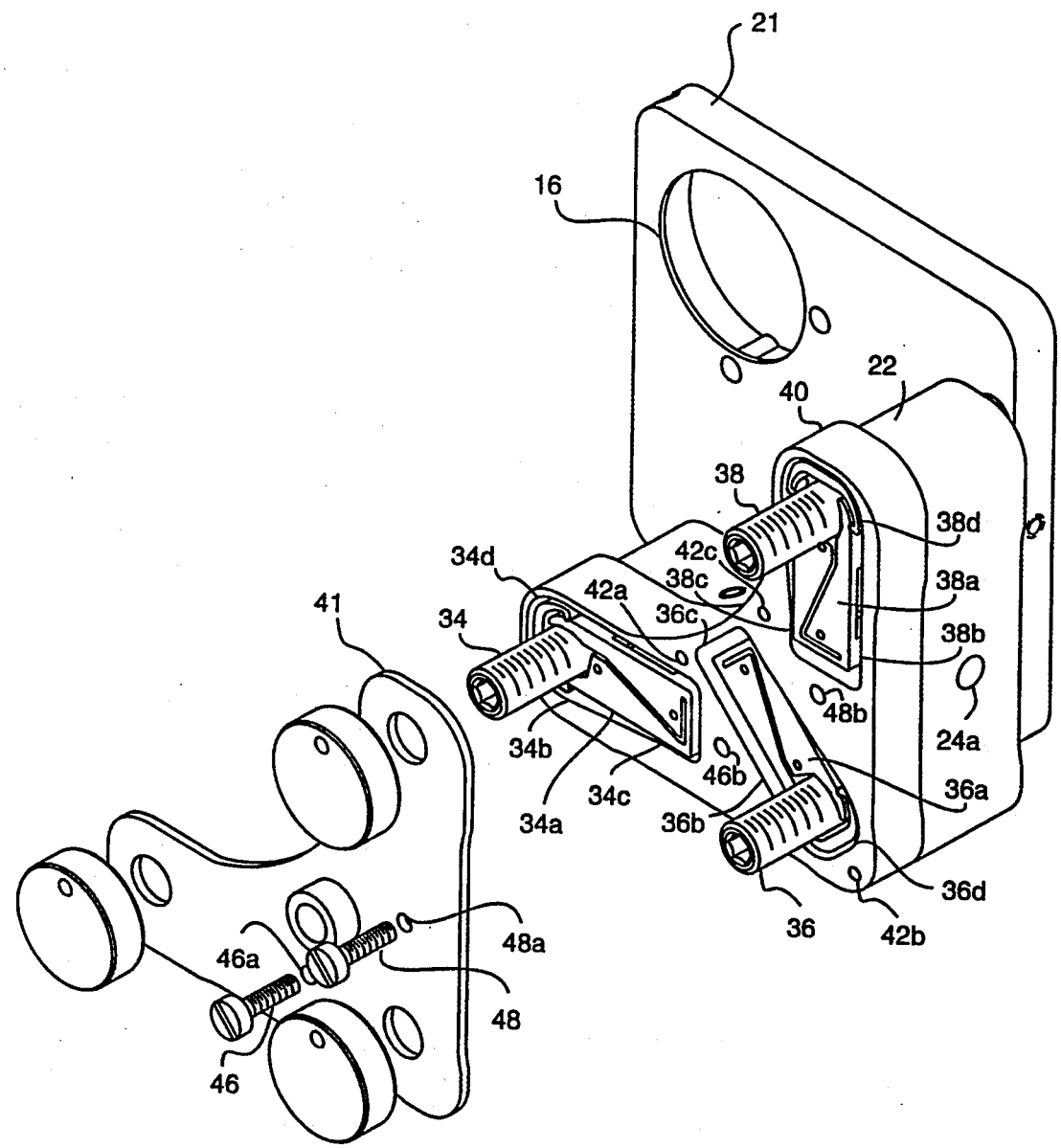
FIG. 4 is an isometric exploded view showing the retention housing for the piezoelectric actuators and the cover plate for the housing.

FIG. 4 is an exploded view illustrating piezoelectric actuators 34a, 36a and 38a in place within apertures 34b, 36b and 38b in actuator housing 40. The piezoelectric actuators are a snug fit with the apertures in the regions 34c, 36c and 38c to prevent rotational movement of the actuator relative to the housing. The apertures are slightly larger than the actuators in the regions 34d, 36d and 38d to accommodate the driving movement of the piezoelectric actuators.

Cover 41 is accurately indexed with respect to actuator housing 40 by means of locator pins, not shown, on the lower surface of cover 41 which pass into index holes 42a, 42b and 42c. Mounting screws 46 and 48 pass through clearance holes 46a and 48a, respectively, in cover 41, and clearance holes 46b and 48b, respectively, in actuator housing 40, to enter threaded holes 46c, not shown, and 48c, in base plate 22. When mounting screws 46 and 48 are tightened, the actuator housing 40 is securely held against base plate 22, and piezoelectric actuators 34a, 36a and 38a are accurately positioned and held to prevent rotation when they are energized with drive signals.

Figure 5:
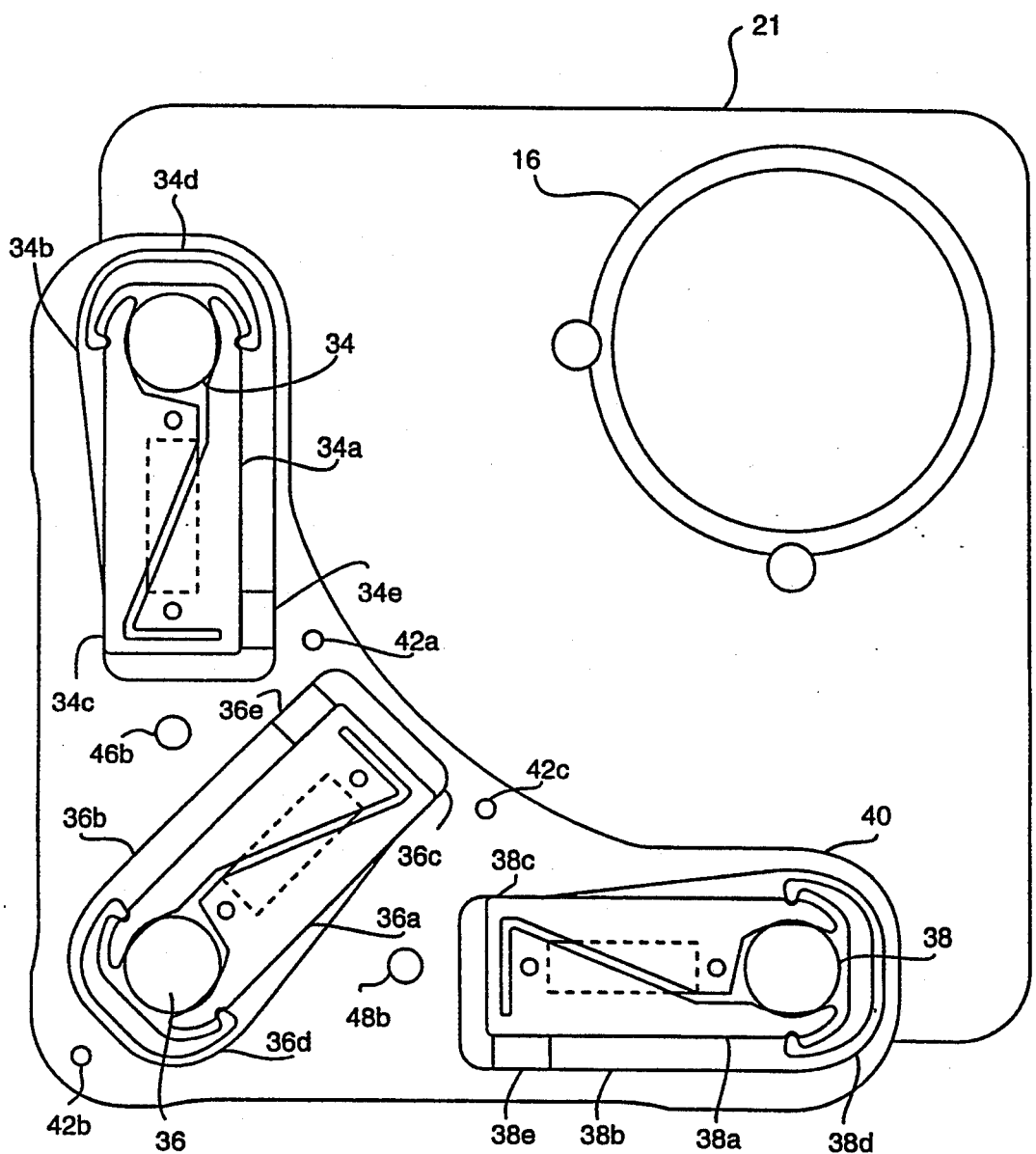
FIG. 5 is a plan view of the retention housing with the piezoelectric actuators positioned within the retention sockets.

FIG. 5 is a top plan view of the mount with cover 41 removed. All reference characters are the same as used to denote elements in the previous views. Resilient pads 34e, 36e and 38e of elastomeric material are positioned between the walls of the actuator housing 40 in the region 34c, 36c and 38c to prevent the actuators 34a, 36a and 38a from rotating when energized. Alternatively, the pads 34e, 36e and 38e can be configured in the form of elastomeric potting compound in the same regions.

Figure 6A:
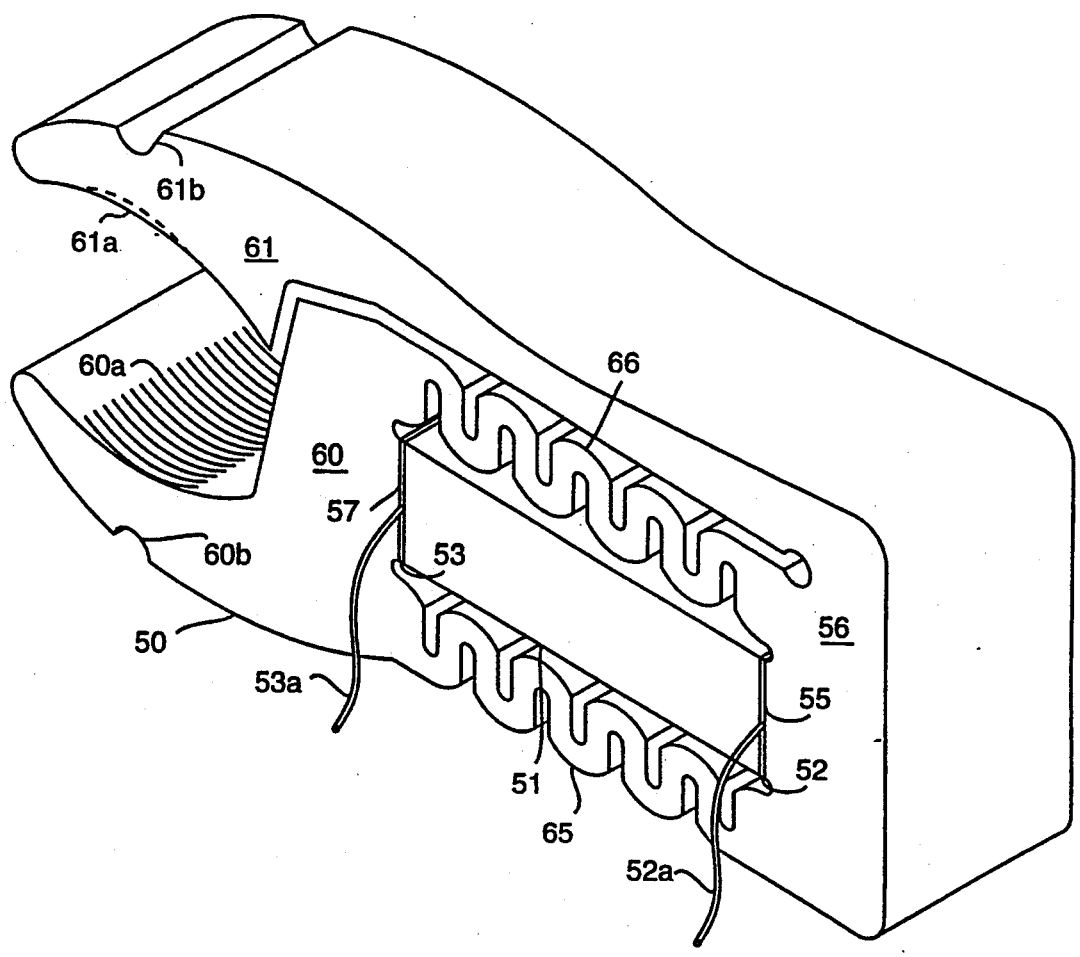
FIG. 6a is an isometric view of a piezoelectric actuator suitable for use in the invention.

The piezoelectric actuator 50 shown in FIG. 6a is an alternative to the preferred embodiment. This actuator includes a piezoelectric element 51 having electrodes 52 and 53 at opposite ends. Lead wires 52a and 53a, electrically connected to the respective electrodes, allow the drive signal to be applied across piezoelectric element 51. The drive signal causes piezoelectric element to lengthen. While two electrodes are shown, the internal structure of piezoelectric element 51 may actually contain a plurality of interconnected electrodes so as to reduce the voltage required to operate the device. A first end 55 of the piezoelectric element 50 is affixed to the base portion 56 of the actuator frame (body), and an opposite end 57 is affixed to a first movable jaw element 60, which co-acts with second movable jaw element 61 to engage an adjustment screw held between the jaws. The internal faces 60a and 61a of jaws 60 and 61 are threaded to accommodate the threads of the adjustment screws which are held between the jaws.

Figure 7A:
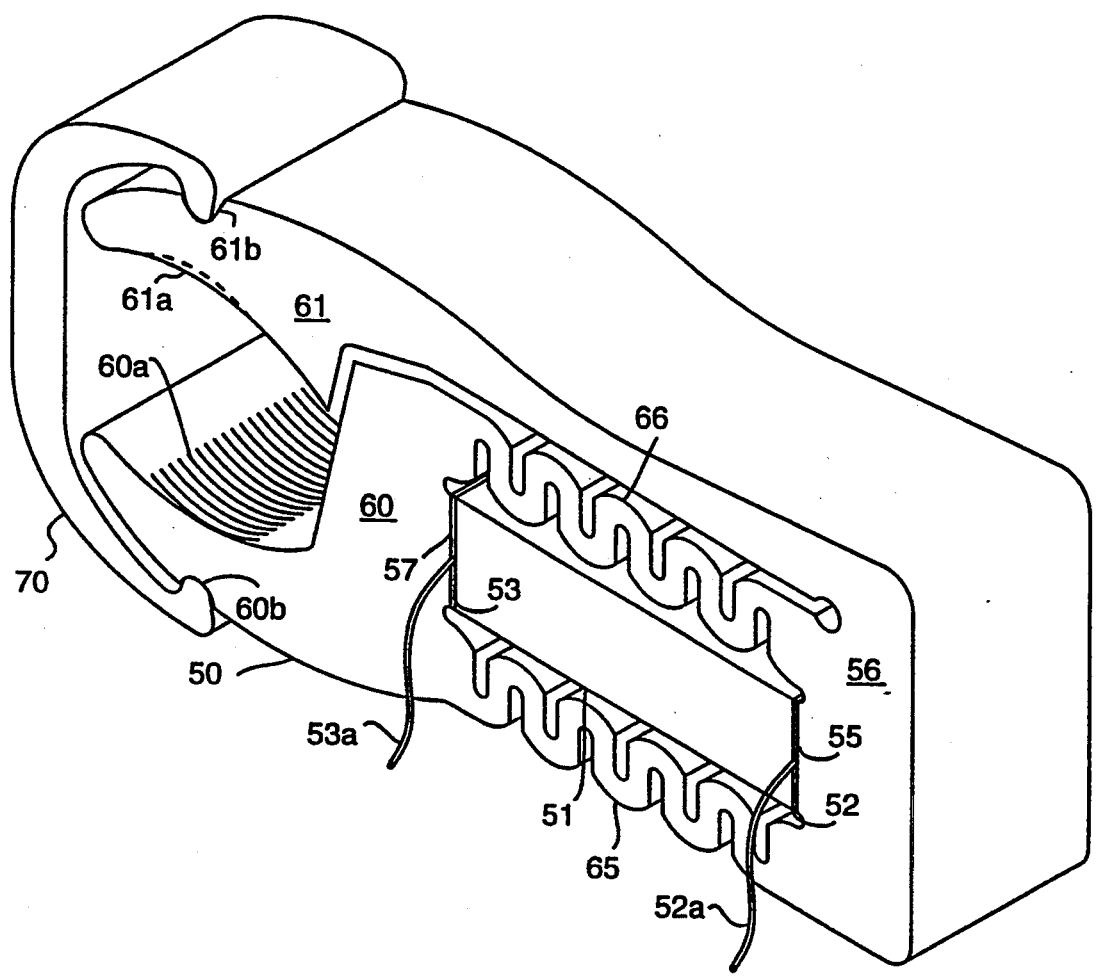
FIG. 7a is an isometric view of the piezoelectric actuator of FIG. 6a with a spring clamp in place over the open end of the device.

Resilient flexure elements 65 and 66 connect base portion 56 and first movable jaw element 60 to accommodate bi-directional lengthwise (longitudinal) motion of piezoelectric element 51. Such lengthwise motion of element 51 causes a longitudinal reciprocating motion of jaw elements 60 and 61, which in turn imparts a rotational motion to a cylindrical element, such as the threaded adjustment screw, held between inner faces 60a and 61a of jaws 60 and 61. A pair of spring retention grooves 60b and 61b in jaw elements 60 and 61 serve to position and retain a flat clamp spring 70, as shown in FIG. 7a, which increases the pressure of the inner faces 60a and 61a against a cylindrical element, such as a threaded adjustment screw, positioned between them. The actuator frame is fabricated from suitable brass stock by means of conventional wire electro-discharge machining techniques. Flat clamp spring 70 may be fashioned from any material having suitable spring and fatigue characteristics.

Figure 6B:
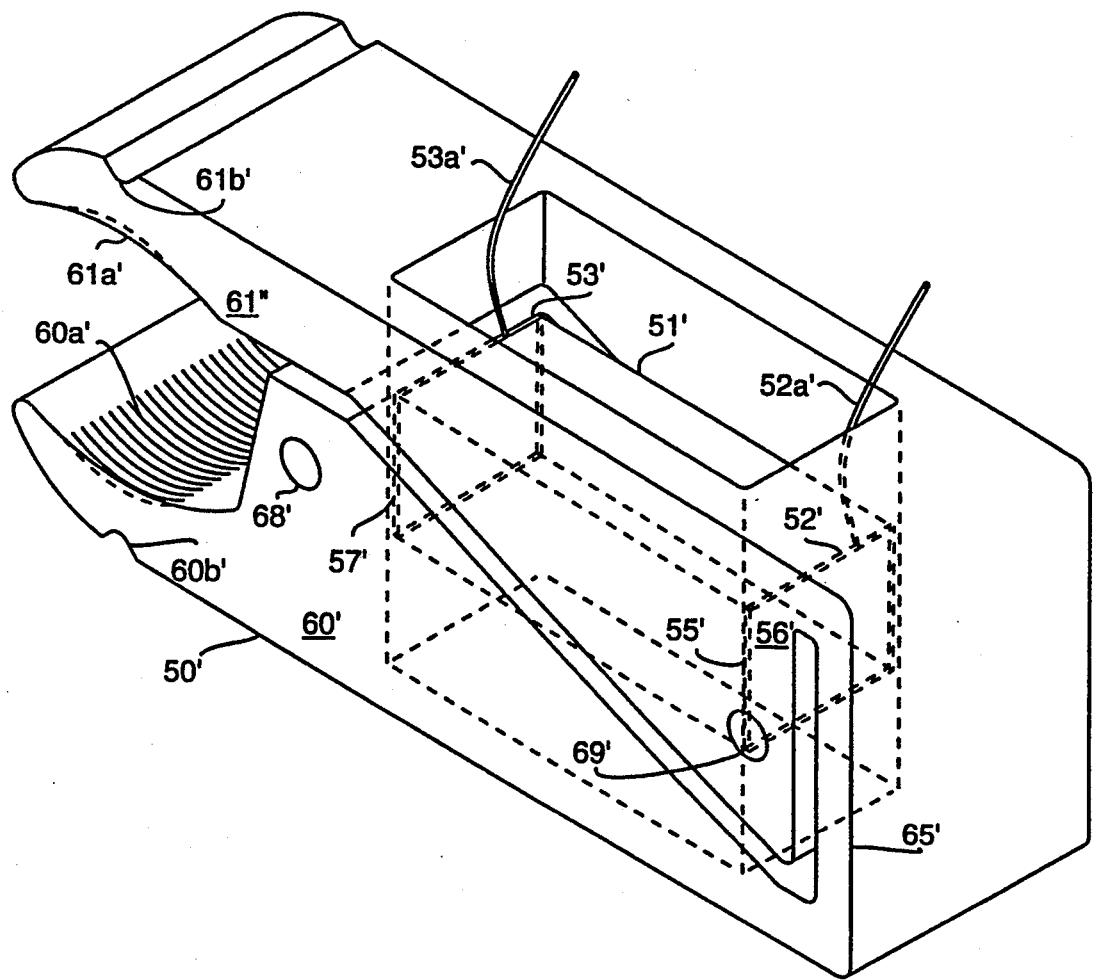
FIG. 6b is an isometric view of the preferred form of piezoelectric actuator for use in the invention.

The piezoelectric actuator 50' shown in FIG. 6b is the preferred embodiment. This actuator includes a piezoelectric element 51' having electrodes 52' and 53' at opposite ends. Lead wires 52a' and 53a', electrically connected to the respective electrodes, allow the drive signal to be applied across piezoelectric element 51'. A drive signal of a first polarity causes piezoelectric element to lengthen. A first end 55' of the piezoelectric element 50' is affixed to the base portion 56' of the actuator frame (body), and an opposite end 57' is affixed to a first movable jaw element 60', which co-acts with second movable jaw element 61' to engage an adjustment screw held between the inner faces 60a' and 61a' of jaws 60' and 61'.

Figure 7B:
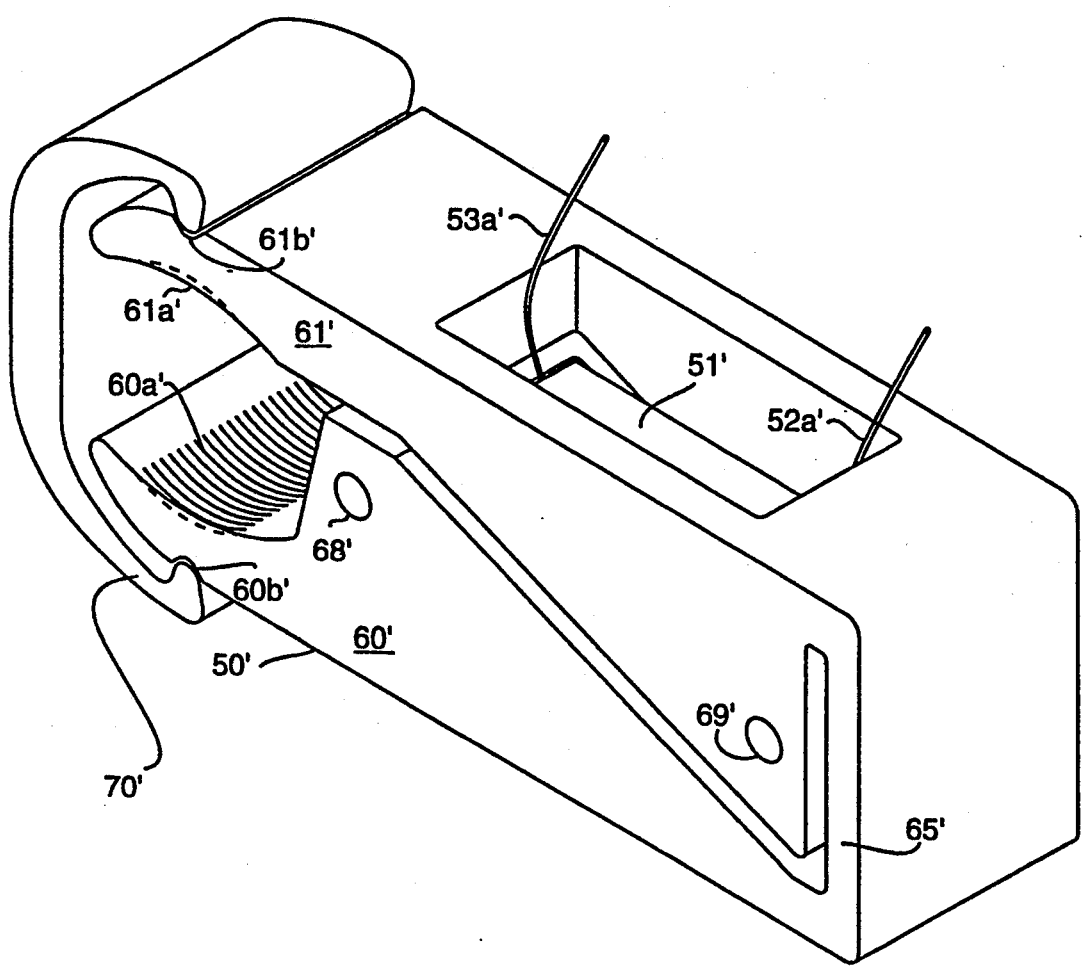
FIG. 7b is an isometric view of the piezoelectric actuator of FIG. 6b with a spring clamp in place over the open end of the device.

Resilient flexure element 65' connects base portion 56' and first movable jaw element 60' to accommodate bi-directional lengthwise (longitudinal) motion of piezoelectric element 51'. Such lengthwise motion of element 51' causes a longitudinal reciprocating motion of jaw elements 60' and 61', which in turn imparts a rotational motion to a cylindrical element, such as a threaded adjustment screw, held between inner faces 60a' and 61a' of jaws 60' and 61'. A pair of spring retention grooves 60b' and 61b' in jaw elements 60' and 61' serve to position and retain a flat clamp spring 70', as shown in FIG. 7b, which increases the pressure of the inner faces 60a' and 61a' against a cylindrical element, such as a threaded adjustment screw, positioned between them. The actuator frame is fabricated from suitable brass stock by means of conventional wire electro-discharge machining techniques. Flat clamp spring 70' may be fashioned from any material having suitable spring and fatigue characteristics.

Holes 68' and 69', extending through the actuator frame, are used during fabrication of the actuator to stretch the frame during cementing of the piezoelectric element 51' so that, after assembly, the piezoelectric element 51' is under compression. This is done to avoid fracturing the bond between the frame and piezoelectric element 51' when an electrical signal is applied to piezoelectric element 51'.

Figure 6C:
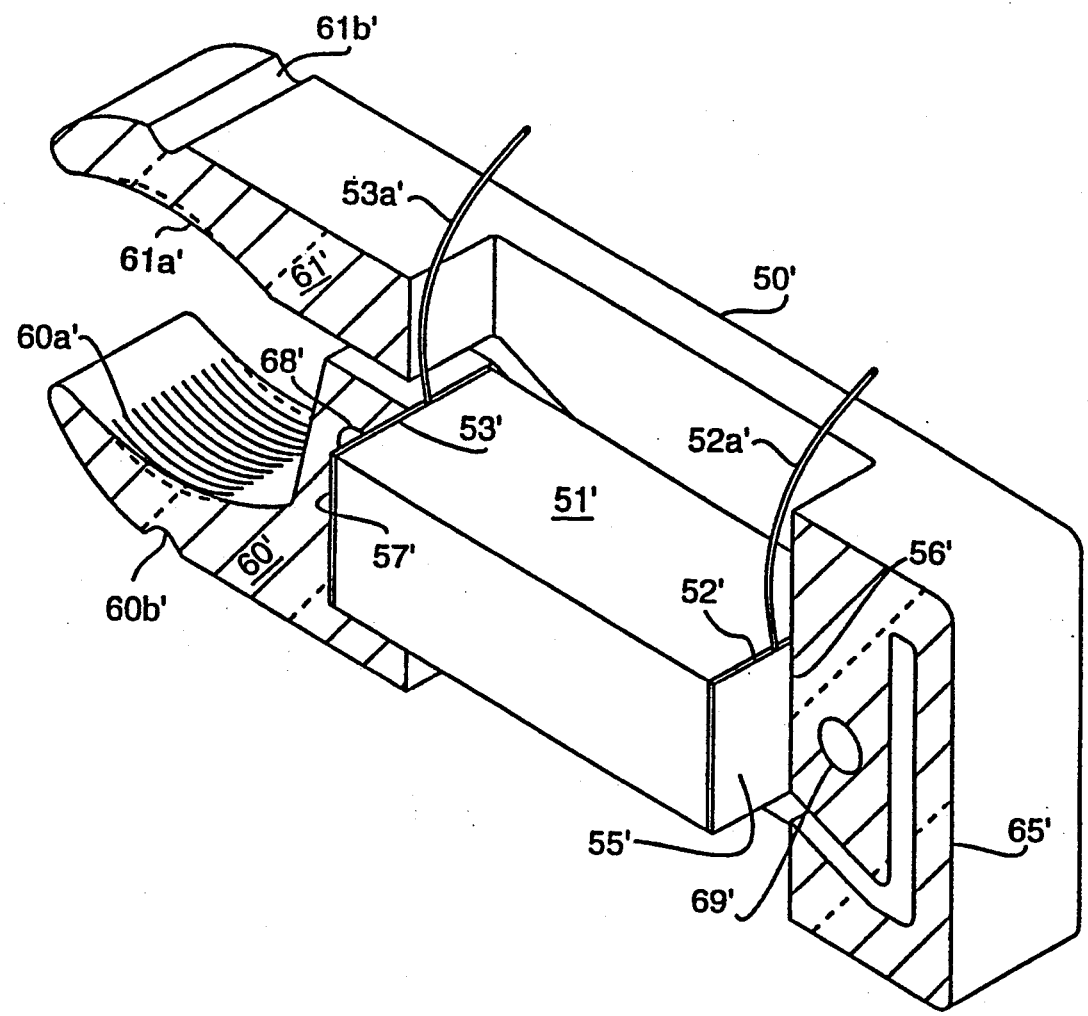
FIG. 6c is an isometric view, partially in section, of the preferred form of piezoelectric actuator for use in the invention.

FIG. 6c is a view of the preferred form of the piezoelectric actuator shown in FIG. 6b, partially in section and with parts cut away to illustrate the internal geometry of the frame. It can be seen that the aperture for the piezoelectric element extends through the actuator frame 50. The piezoelectric element 51 is in contact with the frame only at the ends 55' and 56'.

Figure 8:
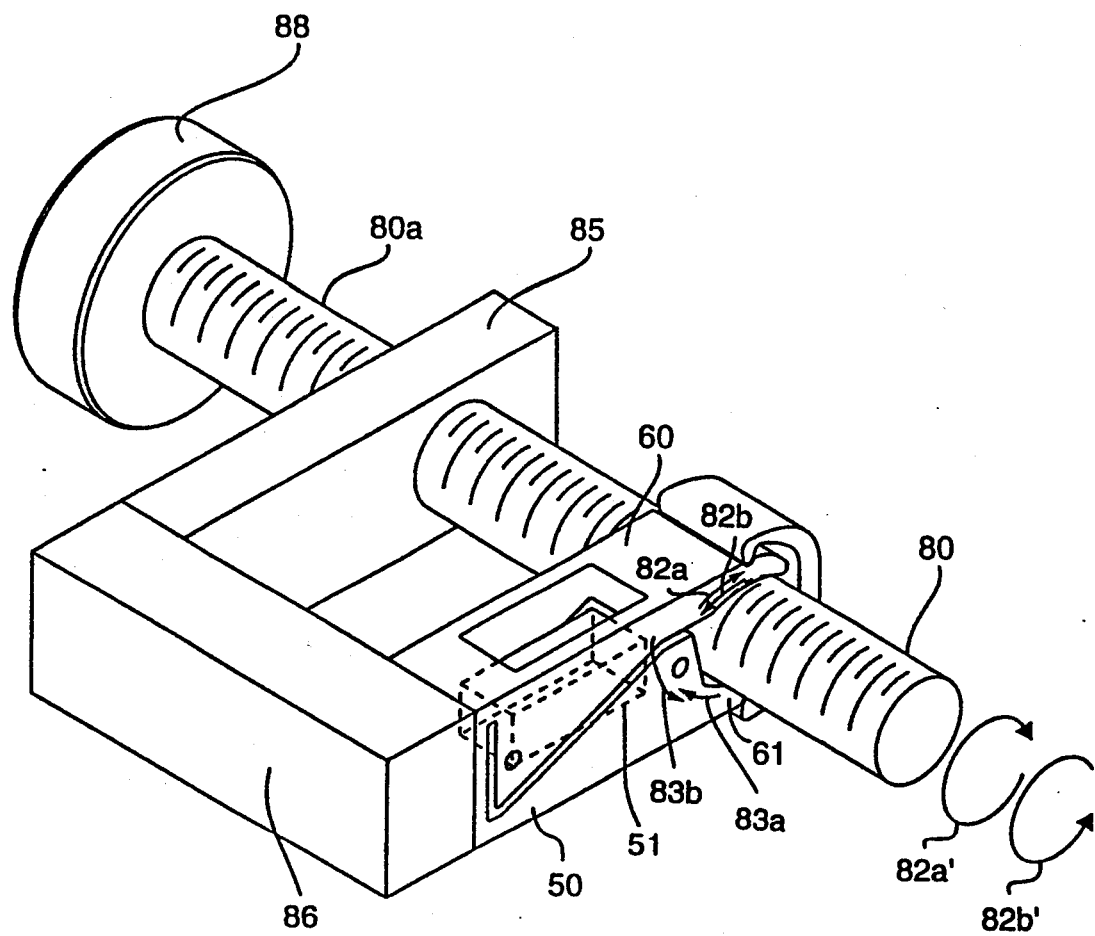
FIG. 8 is a pictorial diagram illustrating the principles governing operation of the invention.

FIG. 8 is a simplified pictorial diagram of the principal elements of the invention. Piezoelectric actuator 50 has jaw elements 60 and 61 positioned about a cylindrical shaft 80, which includes a threaded portion 80a passing through a threaded hole in base plate 85. The frame of piezoelectric actuator 50 is affixed to the base plate 85 by means of flange 86. For the purpose of this explanation, the inertial effects of the shaft 80 are represented by the flywheel 88.

When the polarity of the electrical signal across piezoelectric element 51 is such that element 51 extends and the amplitude of the applied electrical signal is increased, relative longitudinal movement of jaw elements 60 and 61 occurs in the directions of arrows 82a and 83a, respectively. If there is no slippage between the jaws and shaft 80, rotation of shaft 80 takes place in the direction of arrow 82a'. As the amplitude of the electrical signal across piezoelectric element 51 is reduced, piezoelectric element 51 contracts, causing longitudinal movement of jaw elements 60 and 61 in the directions of arrows 82b and 83b, respectively. Again assuming that no slippage occurs between the jaws and shaft 80, rotation of shaft 80 takes place in the direction of arrow 82b'.

Because of the inertia of the shaft 80, a rapidly rising or falling electrical signal will induce such rapid movement of the jaw elements 60 and 61 that slippage between the jaws and shaft 80 will occur. The duration of slippage depends on the waveform and amplitude of the electrical signal applied across the piezoelectric element 51, as well as the mechanical characteristics of the system, such as the frictional engagement between the jaws and shaft 80, the inertia of the shaft 80 and other mechanical elements connected to it, together with the frictional engagement between shaft 80 and the threaded hole in base plate 85.

Conversely, application of a slowly rising or falling signal across piezoelectric element 51 will cause a correspondingly longitudinal movement of the jaw elements 60 and 61, and very little or no slippage between the jaws and shaft 80 will take place.

It follows that selective rotation of shaft 80 may be obtained in either direction 82a or 82b simply by applying a cyclic electrical signal having the proper waveform and polarity. That is, a cyclic signal having a slowly rising waveform followed by a rapidly falling waveform will cause rotation in a first direction. Conversely, a cyclic signal having a rapidly rising waveform followed by a slowly falling waveform will be effective to rotate shaft 80 in the opposite direction. A more complete graphic and mathematical description of the waveform is provided in FIG. 19

Figure 9:
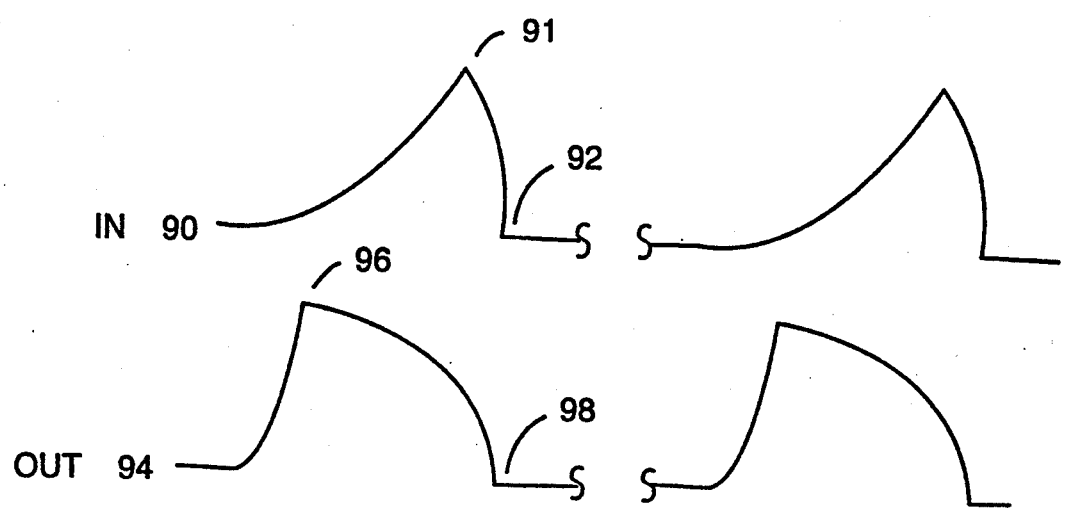
FIG. 9 illustrates the waveforms of the drive signals applied to the piezoelectric actuator to achieve rotation in a clockwise and counterclockwise direction.

In FIG. 9, the waveform beginning at 90 represents the electrical signal which produces rotation in the direction of arrow 82a'. It can be seen that the voltage, represented by the Y axis, increases in the positive direction at a slowly increasing rate until the peak value at point 91 is reached. The voltage at this point represents the maximum value applied across piezoelectric element 51, and therefore, also the maximum length of element 51. Since the applied voltage has been increased slowly, no slippage has occurred between shaft 80 and jaw elements 60 and 61, and shaft 80 has rotated a short distance in the direction of arrow 82a'. The electrical signal then falls sharply as indicated by the portion of the waveform between the peak 91 and the minimum 92. The sharply falling signal causes jaw elements 60 and 61 to move quickly in the direction of arrows 60b and 61b. Since this movement is very rapid, the mechanical characteristics of the system, such as the inertia and frictional engagement of shaft 80, combine to prevent the shaft from following the jaw's longitudinal movement. Repetition of the waveform 90–92 in cyclic fashion causes incremental movement of shaft 80 in the direction of arrow 82a', which causes the adjustment screw to be driven in.

Rotation of shaft 80 in the direction of arrow 82b' is accomplished by the application of an electrical signal as represented by the waveform beginning at point 94. In this case, the relatively rapid increase of the applied voltage causes the piezoelectric element 51 to extend quite rapidly and induce rapid longitudinal motion between jaw elements 60 and 61 in the direction of arrows 82a and 83a. Since the motion is relatively rapid, there is slippage between shaft 80 and jaw elements 60 and 61, and no rotational motion of shaft 80 is created. The applied voltage increases to the maximum value at point 96, corresponding to the maximum length of piezoelectric element 50. The electrical signal then falls slowly, as shown by the portion of the waveform between points 96 and 98. Since the movement of piezoelectric element 50 follows the applied voltage, the longitudinal motion of jaw elements 60 and 61 is sufficiently slow such that the inertia and other mechanical characteristics of the system which prevented shaft 80 from following the jaw movement during the initial phase of the cycle (from point 94 to point 96) are overcome. Jaw elements 60 and 61 therefore remain in non-slipping engagement with shaft 80 during their longitudinal movement in the direction of arrows 82b and 83b, causing shaft 80 to rotate in the direction of arrow 82b', causing the adjustment screw to be driven out. Repetition of the waveforms 94–98 in cyclic fashion cause incremental rotation of shaft 80 in the direction of arrow 82b'.

It would be possible to produce rotational motion in either direction by the application of a linear waveform having a slowing changing and rapidly changing portions in the manner of a saw-tooth waveform. Such waveforms, while functional, do not provide optimal performance in terms of achieving the maximum speed of rotation since the maximum slope of the wave is limited to that which does not produce slippage at the onset of the signal, or, alternatively, a slope which is low enough to provide some engagement between the jaws and the shaft. Neither alternative provides optimum results. Ideally, the waveforms are not linear and take the shape indicated. To provide optimum performance of the system, the portion of the waveform which produces rotation in the desired direction should have a gradually increasing slope since this takes advantage of the shaft acceleration and produces the most rapid rotation in the desired direction. The waveform of the signal in the opposite direction should also have a gradually increasing slope to prevent the jaws from ultimately engaging the shaft in non-slipping relationship. However, since the duration of the portion of the signal which produces jaw movement in the undesired direction may be kept short without substantial prejudicial effects, it is not as critical that it also have a gradually increasing slope. From a practical standpoint, the rapidly rising or falling portion of the waveform is largely dependent on the capacitance of the piezoelectric element, and the slope can be made as great as possible with the selected circuit components. From the theoretical standpoint, it is desirable that the rapidly rising or falling portion of the waveform be at least four times faster than would result in any non-slipping engagement between jaw elements 60 and 61 and shaft 80. In like fashion, it has been found that the slowly rising or falling portion of the waveform be at least four times slower than would result in non-slipping engagement between jaw elements 60 and 61 with shaft 80. These margins accommodate changes in the system variables and ensure reliable operation over long periods of time.

The electronic circuity for generating the appropriate control and drive signals for the piezoelectric actuator shown in FIGS. 10–17 is designed to operate from a nominal 12 volt DC power source. The figures relating to the electronic circuits used with this invention employ a number of control signals. These signals are defined as follows:

CLK—This signal is the system clock. It is a 12 volt square wave having a nominal frequency of 1 kHz.

AIN—A 12 volt square wave synchronous with CLK. It is activated when adjustment screw 34 is to be driven clockwise.

BIN—A 12 volt square wave synchronous with CLK. It is activated when adjustment screw 36 is to be driven clockwise.

CIN—A 12 volt square wave synchronous with CLK. It is activated when adjustment screw 38 is to be driven clockwise.

AOUT—A 12 volt square wave synchronous with CLK. It is activated when adjustment screw 34 is to be driven counter-clockwise.

BOUT—A 12 volt square wave synchronous with CLK. It is activated when adjustment screw 36 is to be driven counter-clockwise.

COUT—A 12 volt square wave synchronous with CLK. It is activated when adjustment screw 38 is to be driven counter-clockwise.

PCA1, PCA2, ... PCC1, PCC2—12 volt signals that control the amount of power extracted from the supply.

Figure 10:
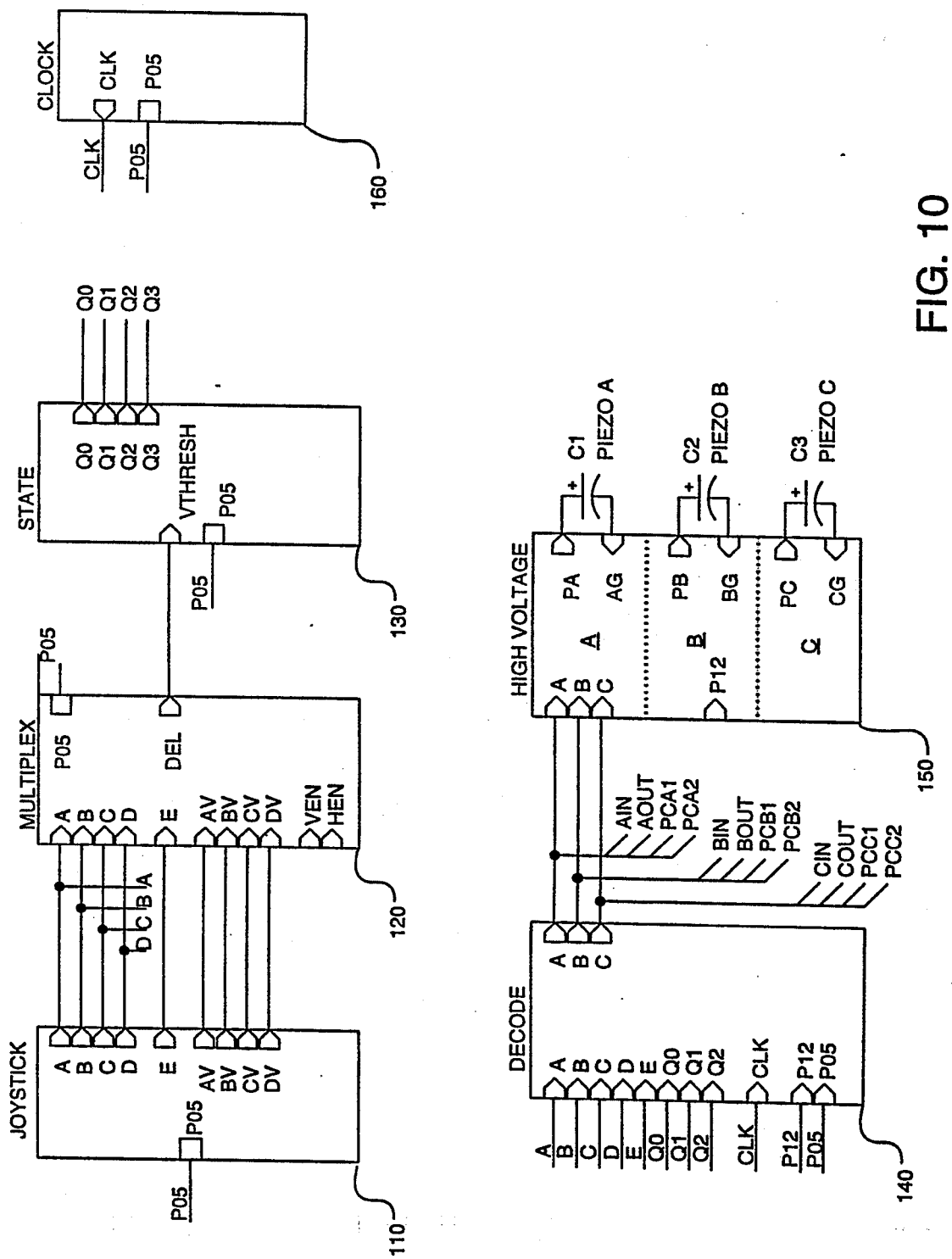
FIG. 10 is a schematic block diagram of the electronic system used to control the piezoelectric actuators.
Figure 11:
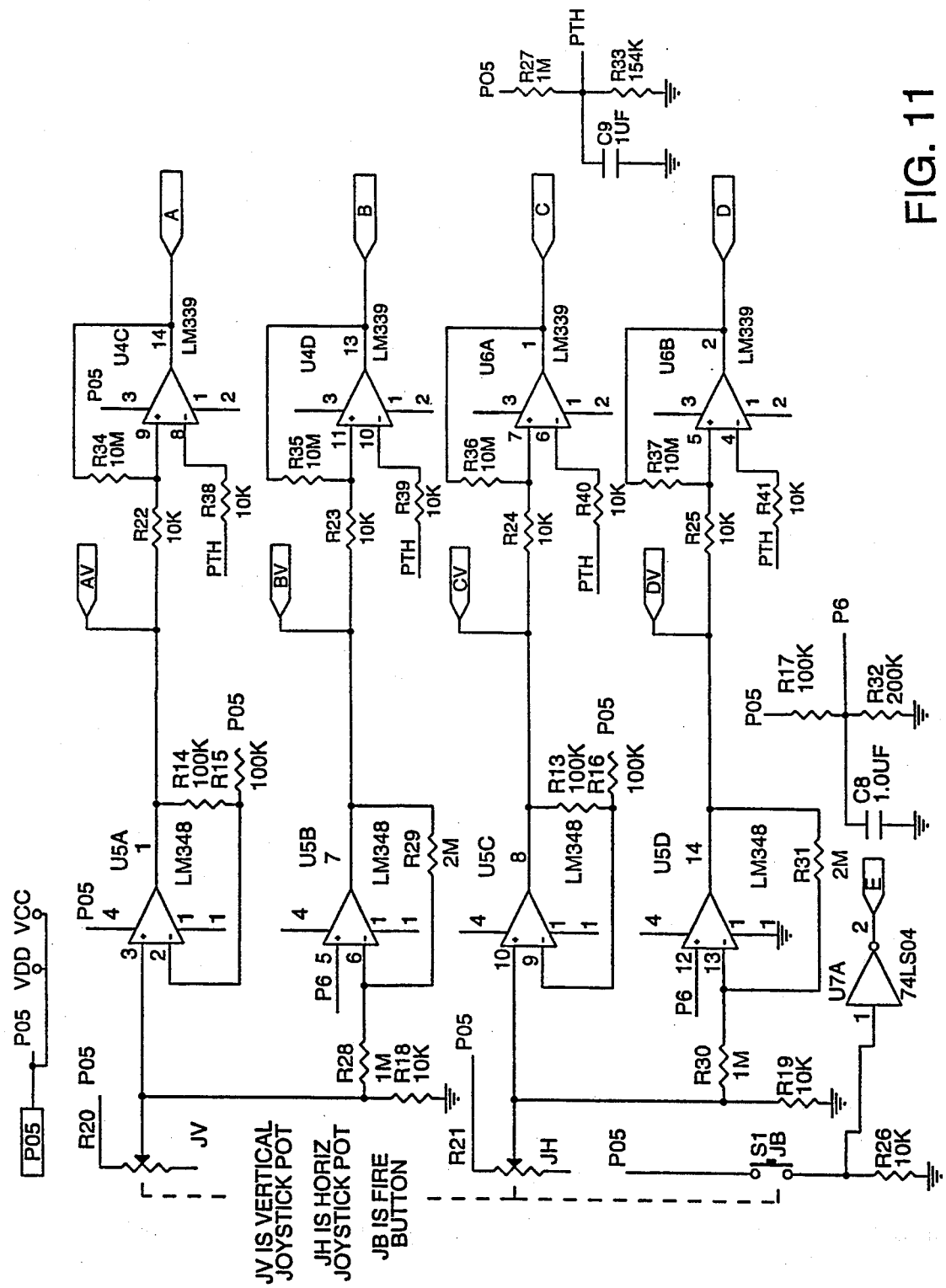
FIG. 11 is a detailed schematic diagram of the circuits associated with the joystick used to develop the control signals for the piezoelectric actuator.
Figure 12:
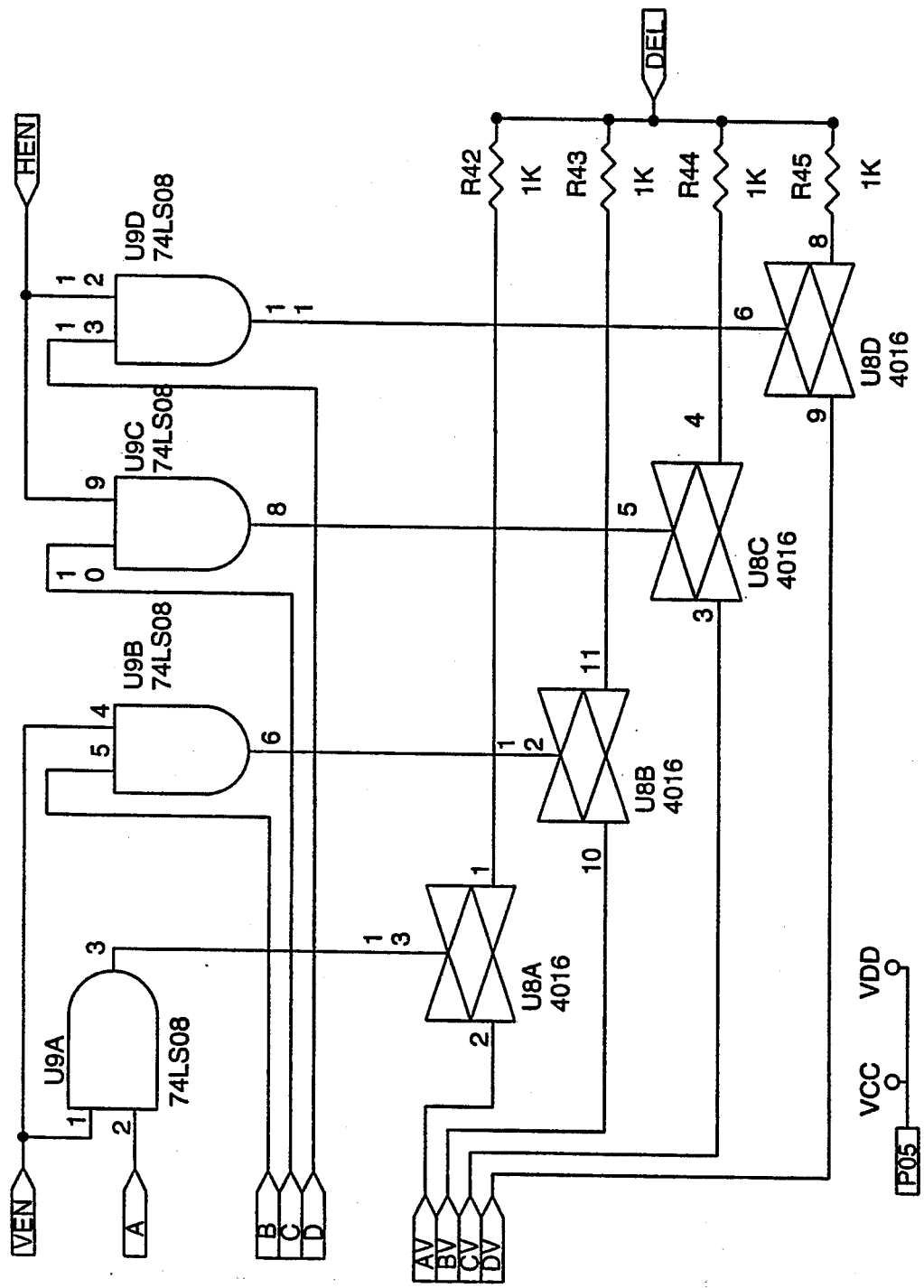
FIG. 12 is a detailed schematic diagram of the multiplex circuits.
Figure 13:
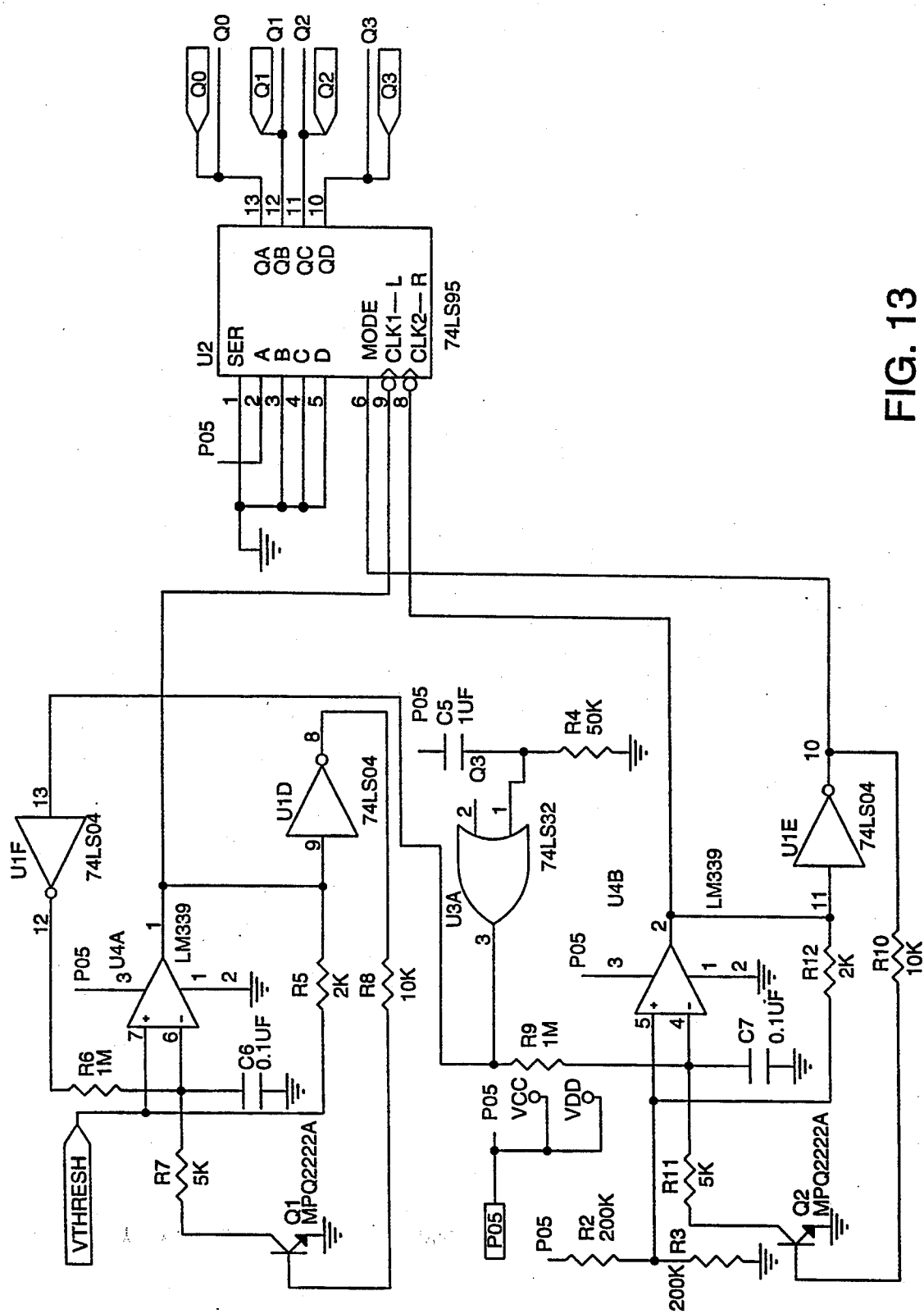
FIG. 13 is a detailed schematic diagram of the state circuits.
Figure 14A:
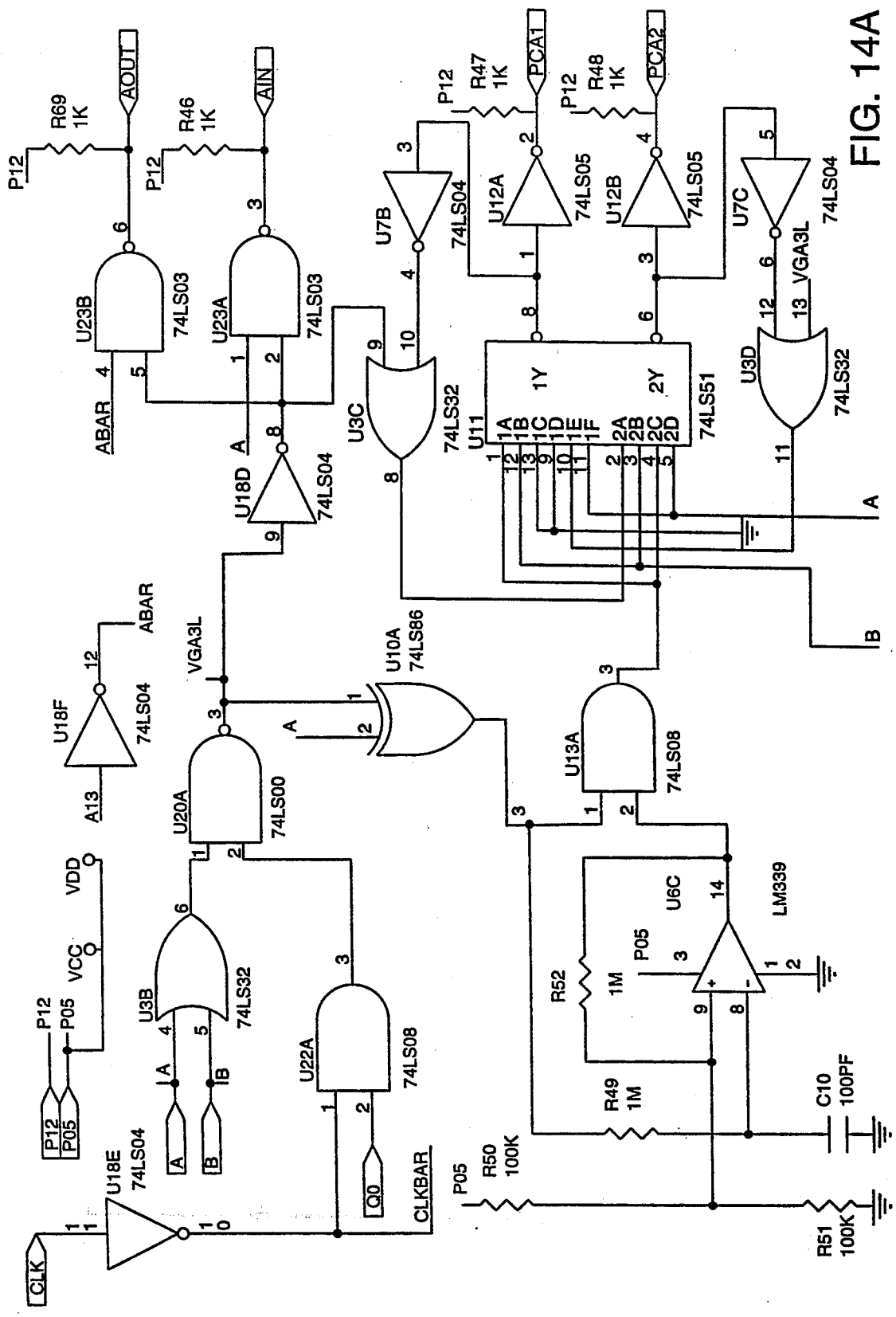
FIGS. 14a-14c is a detailed schematic diagram of the decode circuits.
Figure 14B:
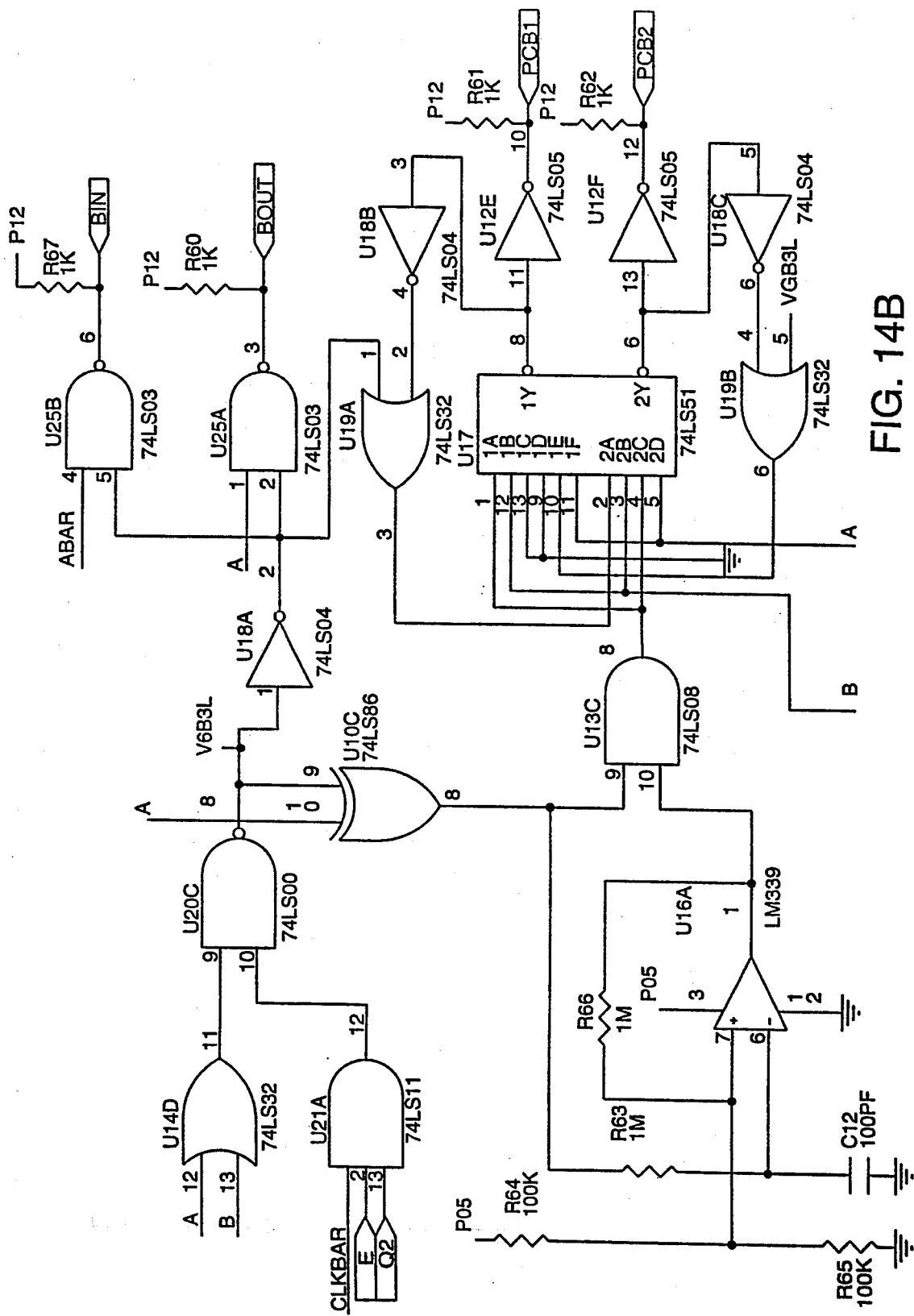
Figure 14C:
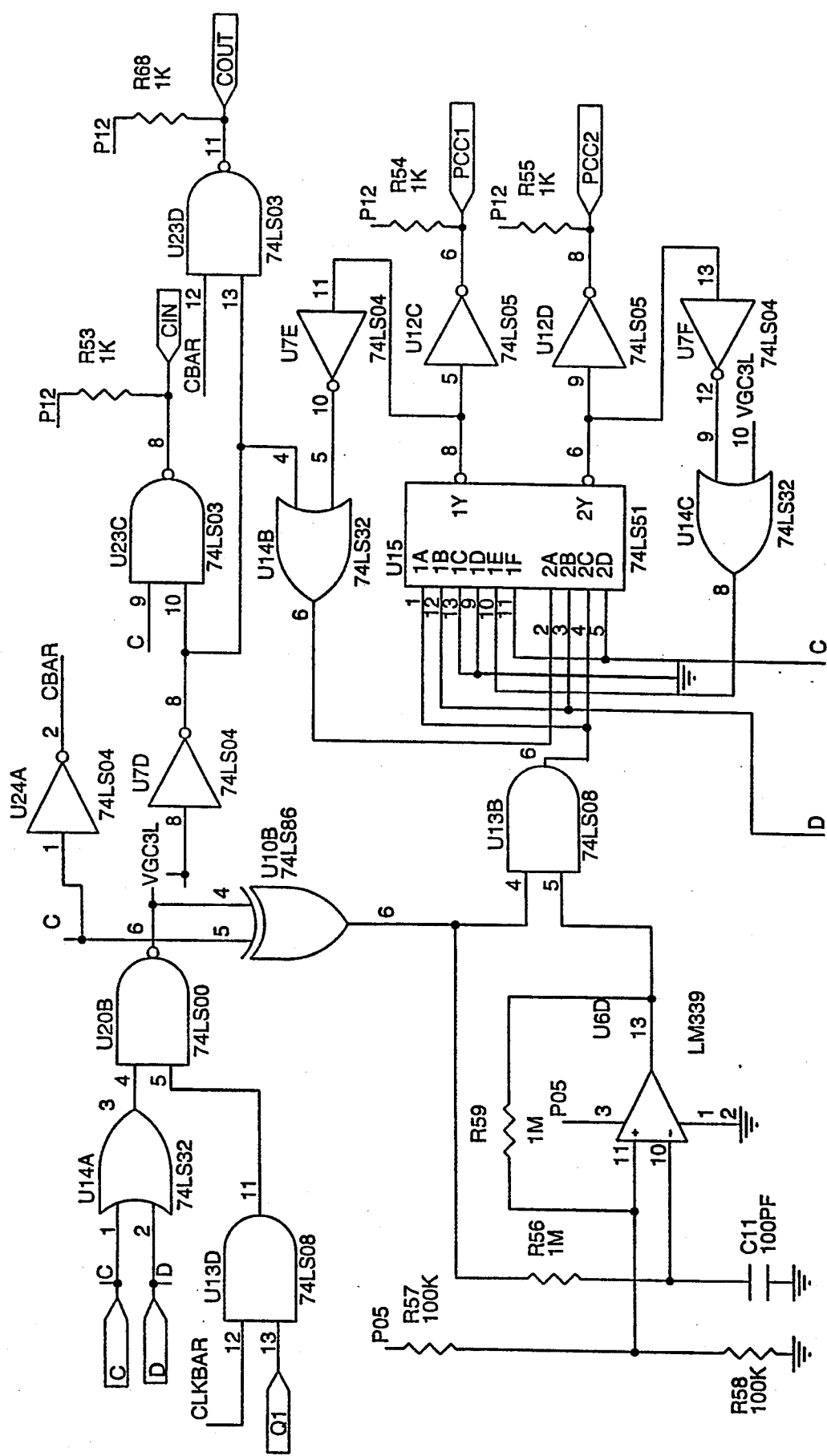

With reference to FIG. 10, the joystick block 110 includes a computer-type joystick which has a vertical motion potentiometer, a horizontal motion potentiometer and a "fire" button. The horizontal and vertical motion potentiometers associated with the joystick develop voltages which are used in block 110 to generate output signals AV, BV, CV, and DV, representing voltages proportional to the displacement of the joystick from the center, or neutral position. These signals are conventional but, by themselves, are not adequate for control of the piezoelectric actuators. The output signals A, B, C, and D are binary in nature, and, in response to the voltages developed by the potentiometers associated with the joystick, assume a high or low value depending on whether the joystick is in the neutral position or has been moved in the upward, downward, left or right directions, respectively.

Multiplex block 120 serves to combine the analog joystick output signals in a fashion which develops a signal on line DEL that controls the amount of time spend driving each of the three piezoelectric devices. For example, when driving adjustment screw 38, this block senses the magnitude of the horizontal joystick output and determines how long the piezoelectric device is connected and thereby also how many drive pulses it will receive.

State block 130 keeps track of which piezoelectric device is being driven. Decode block 140 translates the horizontal and vertical joystick output signals into three actuator screw control signals representing the direction and magnitude of the actuator screw movement necessary to follow the joystick command. The high voltage block responds to the actuator screw controls to generate the appropriate high voltage signals for energization of the appropriate piezoelectric actuator.

The system clock signals are generated by block 160, which provides a system timing signal.

FIGS. 11–15 represent a detailed description of the functional blocks described above.

Figure 15:
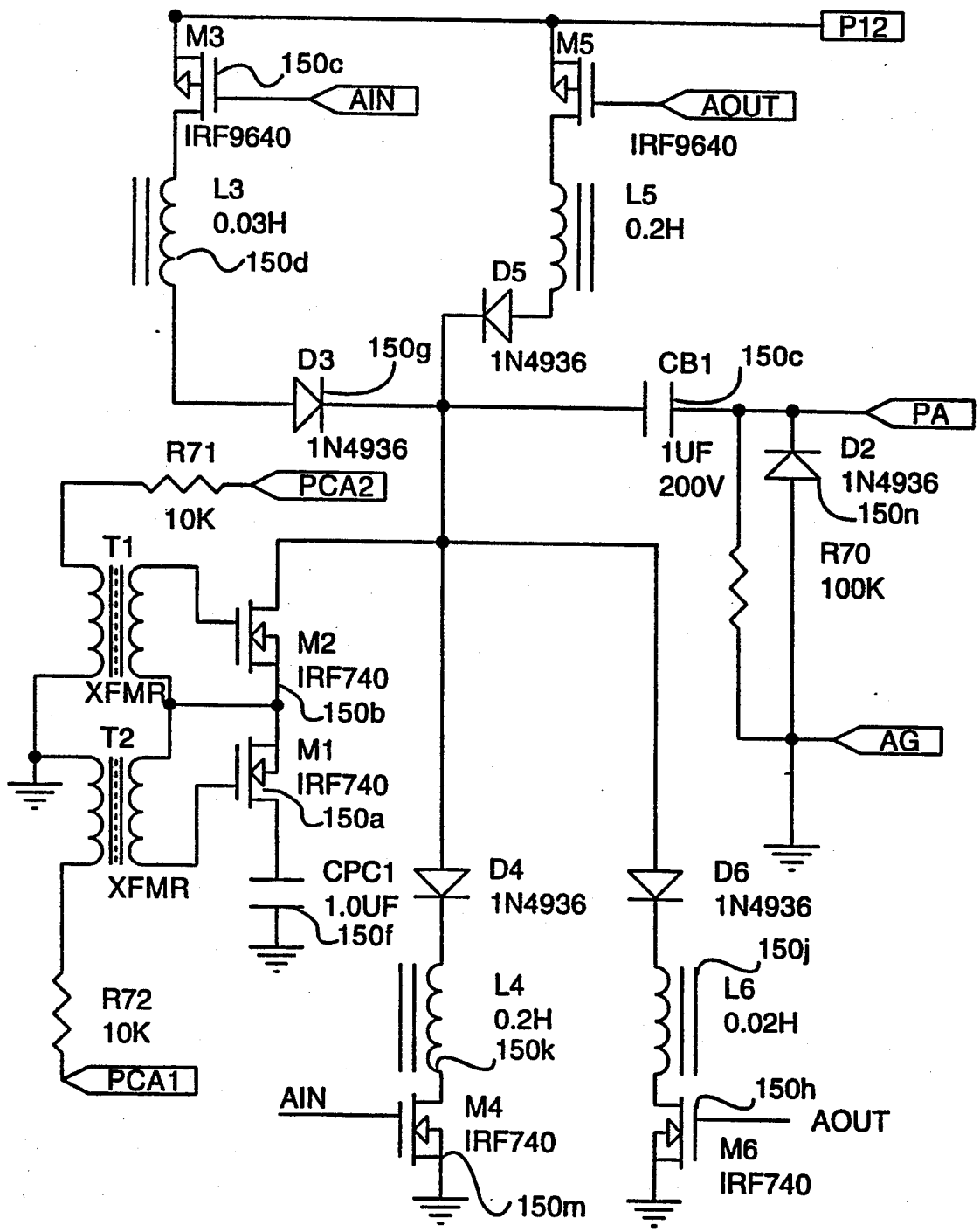
FIG. 15 is a detailed schematic diagram of the A portion of the high voltage circuits which is used to generate the drive signal to the A piezoelectric actuators.
Figure 17:
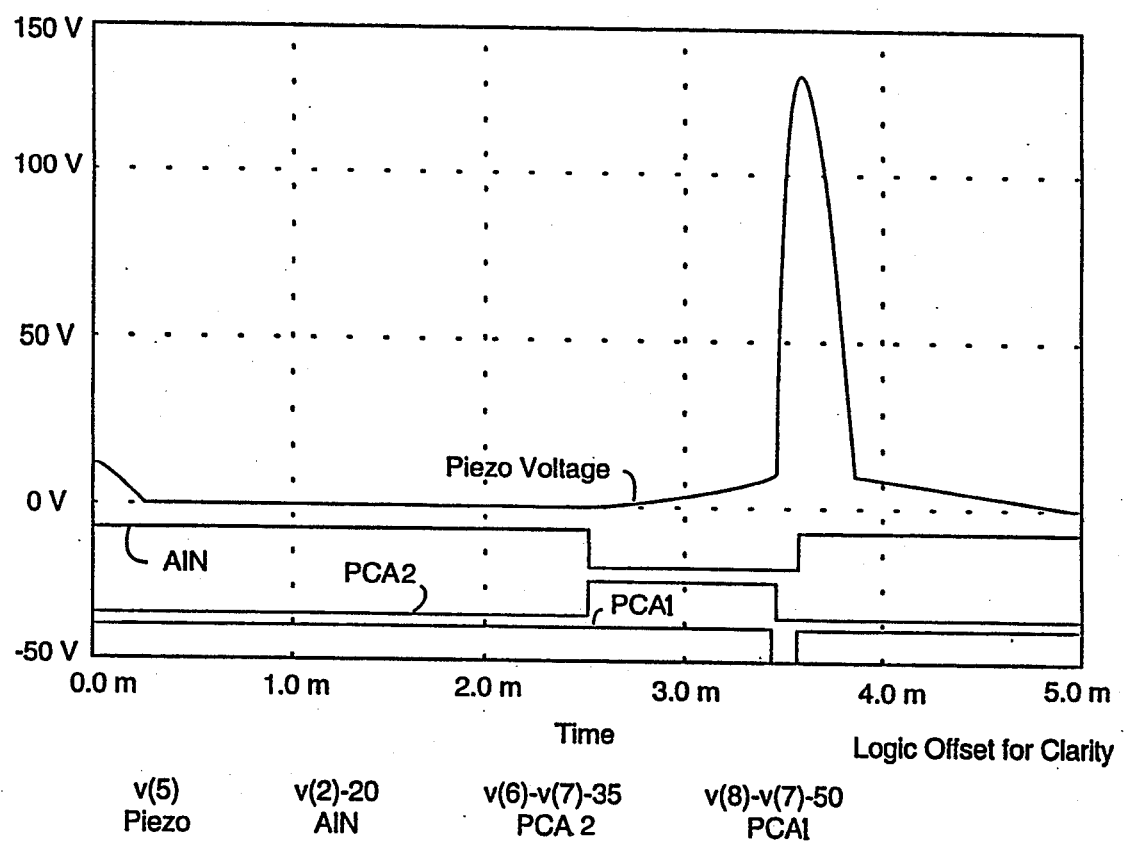
FIG. 17 is a timing diagram illustrating the relationship between the various signals used to generate a high voltage drive signal for a piezoelectric actuator; and, FIG. 18 is a waveform and mathematical expression of the drive signal applied to a piezoelectric actuator.

FIG. 17 is a timing diagram which shows the relationship between AIN, PCA1 and PCA2 in the case where the joystick lever is pushed forward. MOSFET devices 150a, 150b and 150c of FIG. 15 are placed in the conductive state by the signals PCA1, PCA2 and AIN when the CLK signal swings downward. The current in the inductor 150d increases according to the expression $$I_{150d} = \frac{V+}{L_{150d} W_0} \text{SIN } W_0 t$$

where V+ is the supply voltage, $$C_T = C_{150f} + \frac{C_p C_{150e}}{C_p = C_{150e}}$$

$C_p$ is the capacitance of the piezoelectric device and $C_{150f}$ and $C_{150e}$ are both much larger than $C_p$.

At a point in time determined by the delay circuit portion of the decode circuit 140, both MOSFET devices 150a and 150b will turn off, causing the current stored in inductor 150d to be forced into the series circuit formed by capacitor 150e and the effective capacitance C of the piezoelectric device. The time determined by the timing circuit is chosen to be $$t = \frac{\pi}{2W_0}$$

so the output voltage across the piezoelectric device will increase according to the expression $$V_0 = V+ \sqrt{\frac{C_T}{C_p^1}} \text{ SIN } W_0^1 (t - t)$$

where $$C_p^1 = \frac{C_p C_{150e}}{C_p + C_{150e}} \approx C_p$$

and $$W_0^1 = \frac{1}{L_{150d} C_p^1}$$

Figure 18:
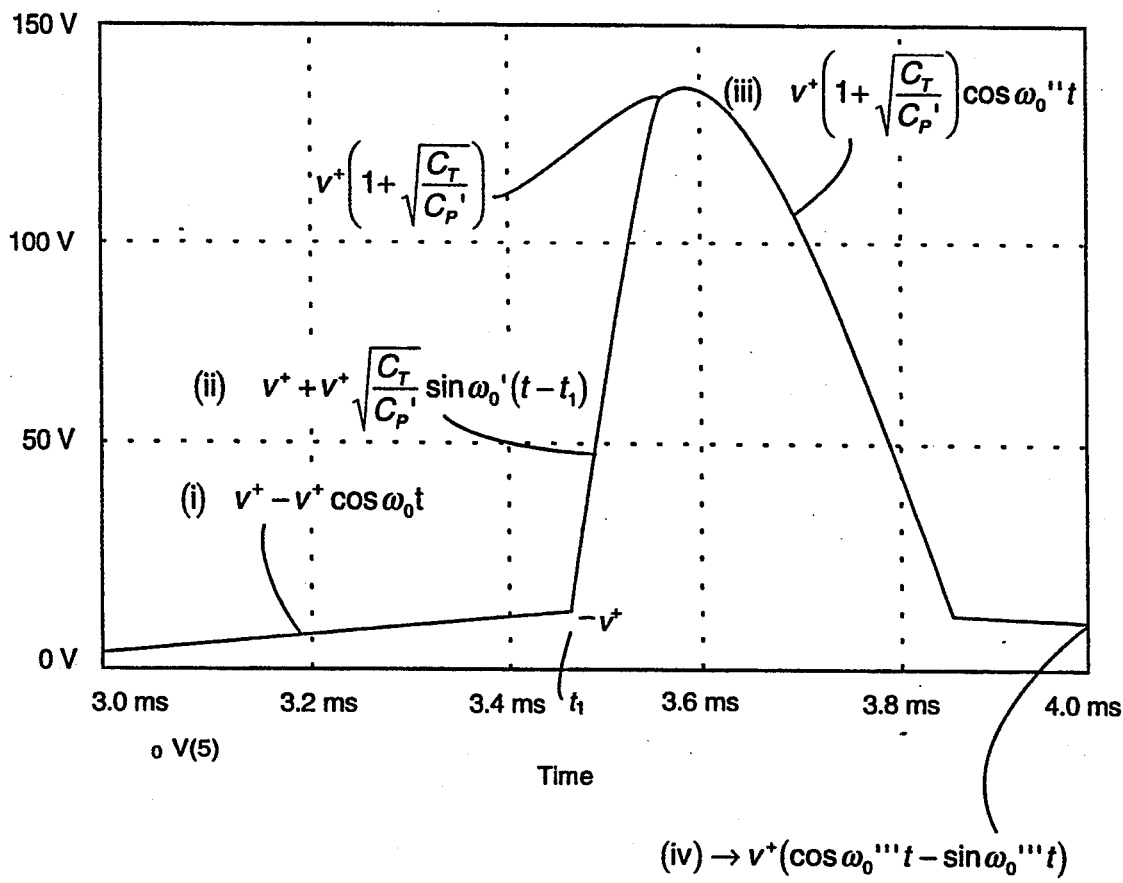

This is illustrated in graphic form by the portion of the curve ii in FIG. 18, beginning at the time $t_1$.

The voltage will stop increasing when the current in inductor 150d decays to zero and diode 150g becomes reverse biased. At this point the voltage across the piezoelectric device is $$V_0 = V+ \left(1 + \sqrt{\frac{C_T}{C_p^1}}\right)$$

For the case where $C_+ = 100 C_{p1}$, there is a voltage multiplication of 11. Since the abrupt change in voltage beginning at time t causes a corresponding abrupt change in velocity of the piezoelectric device, the jaws of the piezoelectric actuator slip on the threaded adjustment screw, and there is no rotary motion induced to the adjustment screw. At the peak of the waveform, the velocity of the piezoelectric device slows to the point where it does not slip. The jaws engage the adjustment screw in non-slipping fashion before the upswing of the CLK signal which causes MOSFET 150a and MOSFET 150h to conduct. At this point the voltage across the piezoelectric device is discharged to ground through inductor 150j. The energy which is not lost in parasitic resistances or work performed by the piezoelectric device is stored in the capacitance across the piezoelectric device in the form of a negative voltage. The value of inductor 150j is chosen to be approximately 10 times the inductance of inductor 150d so the downswing of the waveform, shown in FIG. 18 as the portion of the waveform iii, is held to a value slow enough to ensure non-slipping engagement of the piezoelectric actuator jaws and the threaded adjustment screw.

Rotational motion in the opposite direction is accomplished in similar fashion. However, since there is no negative supply voltage, a potential difference is created by first charging the capacitor 150f. It is then discharging through inductor 150k, with MOSFETS 150a, 150b and 150m conducting. MOSFETS 150a and 150b are then turned off which forces the current in inductor 150k to be pulled from the capacitance across the piezoelectric device. This drives the voltage across the piezoelectric device in the negative direction.

The piezoelectric device is protected against damage from reverse bias by the diode 150n and capacitor 150e, which will charge to create a bias that prevents the voltage across the piezoelectric device from going negative at any point in the steady state waveform.

Figure 16:
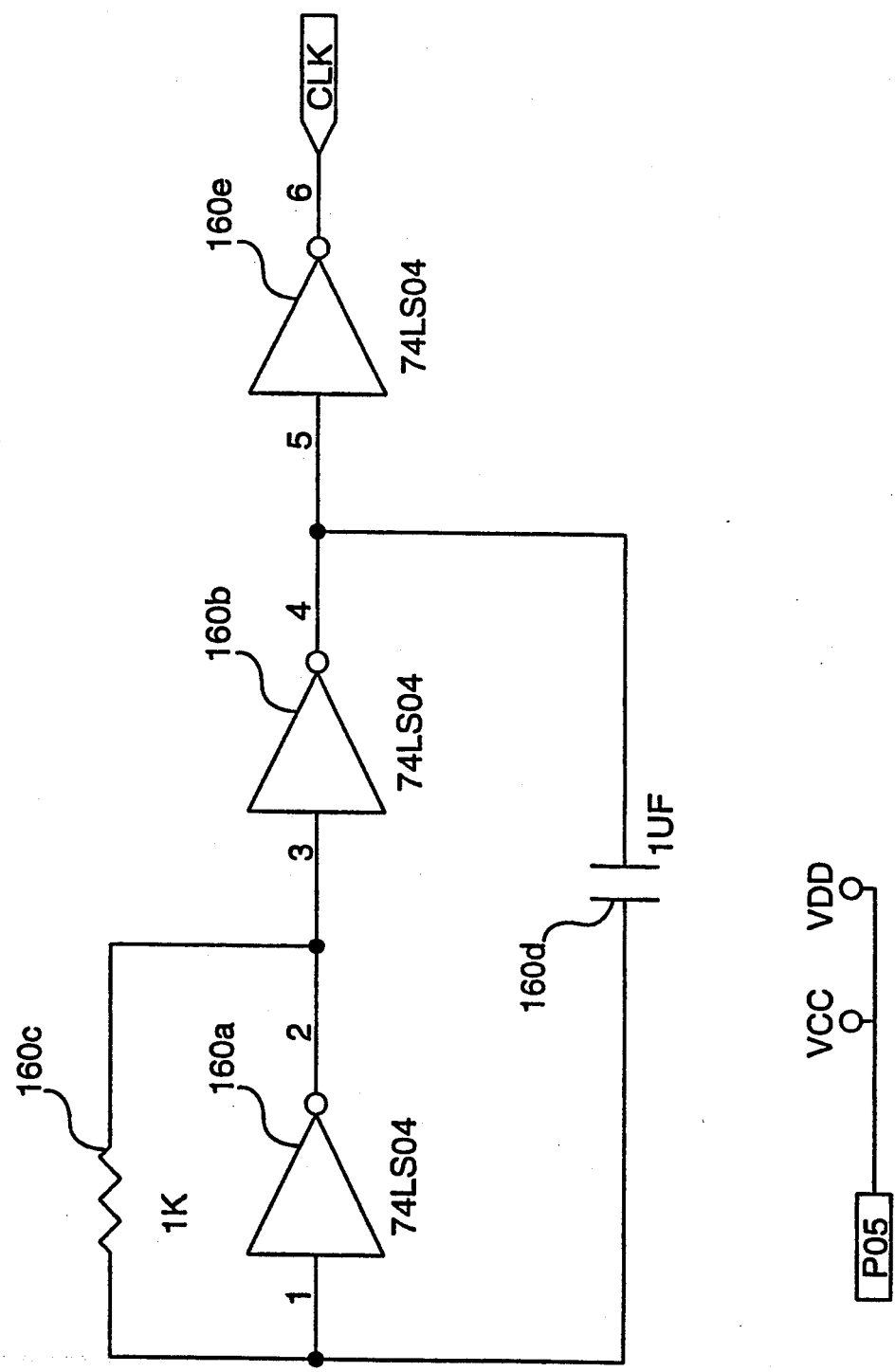
FIG. 16 is a detailed schematic diagram of the clock circuit.

FIG. 16 is a detailed diagram of the clock circuit which generates a system timing signal at a frequency approximating 1 kHz. The integrated circuit amplifier elements 160a and 160b are interconnected by means of resistor 160c and capacitor 160d to create an oscillator circuit. The amplifier element 160e serves as a buffer to isolate the output load from the frequency determining portion of the circuit.

Various modifications can be made to the present invention without departing from the apparent scope hereof.

We claim:

1. A piezoelectric driven actuator for rotation of a shaft positioned for rotational movement within a hole in a mount element, comprising:
   a. an actuator frame;
   b. said frame including a first, movable, jaw having a portion for engagement with the shaft to be driven, said frame further including a second jaw element having a portion for engagement with the shaft to be driven;
   c. actuator frame restraint means engaging said frame and the mount element to prevent rotation of said frame relative to the shaft;
   d. said first and second jaws being positioned in spaced opposing relationship to clamp the shaft there between;
   e. a piezoelectric actuator mounted in said frame for parallel movement of said first jaw element relative to said second jaw element;
   f. drive means, responsive to a control signal, for generating and applying an electrical drive signal to said piezoelectric actuator;

g. said electrical drive signal having a first portion for effecting a first dimensional change of said piezoelectric actuator and a second portion for effecting a second dimensional change of said piezoelectric actuator to produce reciprocating movement of said first jaw element relative to said second jaw movement; and, h. said drive means further including acceleration and velocity control means for controlling said first dimensional change to provide a lower acceleration and velocity which maintains non-slipping engagement between said first and second jaws and the shaft and for controlling said second dimensional change to provide a higher acceleration and velocity which causes said first and second jaws to slip on the shaft due to the inertia of the threaded shaft for rotational motion of the shaft in a first direction.

2. An actuator according to claim 1 further including means for applying a control signal to cause said drive means to generate and apply said drive signal to said piezoelectric actuator.

3. An actuator according to claim 1 wherein said drive means includes means responsive to said control signal for interchanging the relative accelerations and velocities of said first and second dimensional changes, whereby the frictional engagement of the threaded shaft between said jaws, the clamping force of said jaws, the inertia and friction of the threaded shaft and the accelerations and velocities of said first and second dimensional changes provide non-slipping engagement of said jaws with the shaft during the relatively slower movement of said piezoelectric actuator and slipping engagement of the jaws with the shaft during the faster movement allowing the rotational movement of the shaft to be reversed by interchanging the relative accelerations and velocities of said first and second dimensional changes.

4. An actuator according to claim 1 wherein said drive means generates and applies an electrical signal which is cyclic.

5. An actuator according to claim 1 wherein said velocity control means in said drive means includes means responsive to a control signal for controlling the dimensional change of said piezoelectric actuator.

6. A piezoelectric actuator comprising:

a. a frame having first and second opposed jaw means for engagement with an output shaft;

b. said frame having a resilient flexure portion intermediate said first and second jaw means to accommodate longitudinal displacement of said first jaw means relative to said second jaw means;

c. jaw spring means in engagement with said first and second jaw means to bias said first and second jaw means towards each other.

d. an elongate piezoelectric element having a first end portion affixed to said frame at a first point in rigid relationship with said first jaw means, and a second end portion affixed to said frame at a second point in rigid relationship with said second jaw element; and, e. said resilient flexure portion intermediate said first and second points of connection to said piezoelectric element accommodating longitudinal motion of said first jaw means relative to said second jaw means upon a change in longitudinal dimension of said piezoelectric element caused by an electrical signal applied to said piezoelectric element.

7. A device according to claim 6 including first and second spring retention means disposed on the outer side of said jaw means, and said jaw spring means comprises a flat spring having first and second end portions in engagement with said first and second spring retention means, respectively.

8. A joystick controlled, three screw, adjustable optical mount comprising:

a. a base plate for rigid mounting on an optical bench;

b. an adjustable stage plate attached to said base plate and positionable relative thereto for supporting an optical element;

c. first, second and third adjustment screws passing through threaded holes in said base plate and bearing against said stage plate for moving said stage plate relative to said base plate;

d. first, second and third piezoelectric actuator means respectively associated with said first, second and third adjustment screws for driving said screws inwardly, toward said stage plate, and outwardly, away from said stage plate;

e. joystick means for developing horizontal and vertical joystick output signals representing joystick displacement from a neutral position;

f. multiplex means connected to said joystick means for combining said joystick output signals to develop a drive time signal responsive to the magnitude of said joystick output signals;

g. joystick decode means connected to said joystick means for translating said horizontal and vertical joystick output signals to first, second and third actuator screw control signals representing the magnitude and direction of respective actuator screw movement responsive to said joystick output signals; and, h. high voltage drive means connected to said joystick decode means and responsive to said first, second and third actuator screw control signals and connected to said first, second and third piezoelectric actuator means for generating first, cyclic, piezoelectric actuator drive signals having a slowing rising waveform followed by a sharply falling waveform for selectively energizing said piezoelectric adjustment screw actuators for rotational motion of said adjustment screws in a first direction, and second, cyclic, piezoelectric actuator drive signals having a sharply rising waveform followed by a slowly falling waveform for selectively energizing said piezoelectric adjustment screw actuators for rotational motion of said adjustment screws in a second direction and wherein said first, second and third piezoelectric actuator means are devices according to claim 6.

9. A device according to claim 8 wherein said first, second and third piezoelectric actuator means are devices according to claim 7.

* * * * *